United States Patent
Lindemann et al.

(10) Patent No.: US 9,887,983 B2
(45) Date of Patent: Feb. 6, 2018

(54) APPARATUS AND METHOD FOR IMPLEMENTING COMPOSITE AUTHENTICATORS

(71) Applicants: Rolf Lindemann, Steele (DE); Davit Baghdasaryan, San Francisco, CA (US)

(72) Inventors: Rolf Lindemann, Steele (DE); Davit Baghdasaryan, San Francisco, CA (US)

(73) Assignee: Nok Nok Labs, Inc., Palo Alto, CA (US)

(*) Notice: Subject to any disclaimer, the term of this patent is extended or adjusted under 35 U.S.C. 154(b) by 0 days.

(21) Appl. No.: 14/066,384

(22) Filed: Oct. 29, 2013

(65) Prior Publication Data
US 2015/0121068 A1    Apr. 30, 2015

(51) Int. Cl.
H04L 29/06 (2006.01)
H04L 9/00 (2006.01)
H04L 9/32 (2006.01)

(52) U.S. Cl.
CPC .......... *H04L 63/0823* (2013.01); *H04L 9/006* (2013.01); *H04L 9/3265* (2013.01); *H04L 63/123* (2013.01); *H04L 63/0861* (2013.01); *H04L 2463/082* (2013.01)

(58) Field of Classification Search
CPC ........ G06F 21/577; G06F 21/31; G06F 21/32; G06F 21/50; G06F 2221/2107
USPC .............................. 713/158; 726/6
See application file for complete search history.

(56) References Cited

U.S. PATENT DOCUMENTS

| | | |
|---|---|---|
| 5,280,527 A | 1/1994 | Gullman et al. |
| 5,764,789 A | 6/1998 | Pare, Jr. et al. |
| 6,088,450 A | 7/2000 | Davis et al. |
| 6,178,511 B1 | 1/2001 | Cohen et al. |
| 6,377,691 B1 | 4/2002 | Swift et al. |
| 6,618,806 B1 | 9/2003 | Brown et al. |
| 6,751,733 B1 | 6/2004 | Nakamura et al. |

(Continued)

FOREIGN PATENT DOCUMENTS

| | | |
|---|---|---|
| CN | 1705925 A | 12/2005 |
| CN | 102763111 A | 10/2012 |

(Continued)

OTHER PUBLICATIONS

Zhang, "Security Verification of Hardware-enabled Attestation Protocols", 2012, IEEE, p. 47-54.*

(Continued)

*Primary Examiner* — Kenneth Chang
*Assistant Examiner* — Gregory Lane
(74) *Attorney, Agent, or Firm* — Nicholson De Vos Webster & Elliott LLP

(57) ABSTRACT

A system, apparatus, method, and machine readable medium are described for implementing a composite authenticator. For example, an apparatus in accordance with one embodiment comprises: an authenticator for authenticating a user of the apparatus with a relying party, the authenticator comprising a plurality of authentication components; and component authentication logic to attest to the model and/or integrity of at least one authentication component to one or more of the other authentication components prior to allowing the authentication components to form the authenticator.

19 Claims, 8 Drawing Sheets

(56) References Cited

U.S. PATENT DOCUMENTS

| | | | |
|---|---|---|---|
| 6,842,896 B1 | 1/2005 | Redding et al. | |
| 6,938,156 B2* | 8/2005 | Wheeler et al. | 713/170 |
| 7,155,035 B2 | 12/2006 | Kondo et al. | |
| 7,194,763 B2 | 3/2007 | Potter et al. | |
| 7,263,717 B1 | 8/2007 | Boydstun et al. | |
| 7,444,368 B1 | 10/2008 | Wong et al. | |
| 7,487,357 B2 | 2/2009 | Smith et al. | |
| 7,512,567 B2 | 3/2009 | Bemmel et al. | |
| 7,698,565 B1 | 4/2010 | Bjorn et al. | |
| 7,865,937 B1 | 1/2011 | White | |
| 7,941,669 B2 | 5/2011 | Foley et al. | |
| 8,060,922 B2 | 11/2011 | Crichton | |
| 8,166,531 B2 | 4/2012 | Suzuki | |
| 8,245,030 B2 | 8/2012 | Lin | |
| 8,284,043 B2 | 10/2012 | Judd et al. | |
| 8,291,468 B1 | 10/2012 | Chickering | |
| 8,353,016 B1 | 1/2013 | Pravetz et al. | |
| 8,359,045 B1 | 1/2013 | Hopkins, III | |
| 8,458,465 B1 | 6/2013 | Stern et al. | |
| 8,489,506 B2 | 7/2013 | Hammad et al. | |
| 8,516,552 B2 | 8/2013 | Raleigh | |
| 8,555,340 B2 | 10/2013 | Potter et al. | |
| 8,561,152 B2 | 10/2013 | Novak et al. | |
| 8,584,224 B1 | 11/2013 | Pei et al. | |
| 8,607,048 B2 | 12/2013 | Nogawa | |
| 8,646,060 B1 | 2/2014 | Ben | |
| 8,713,325 B2 | 4/2014 | Ganesan | |
| 8,719,905 B2 | 5/2014 | Ganesan | |
| 8,776,180 B2* | 7/2014 | Kumar et al. | 726/3 |
| 8,856,541 B1 | 10/2014 | Chaudhury et al. | |
| 8,949,978 B1 | 2/2015 | Lin | |
| 8,958,599 B1 | 2/2015 | Starner | |
| 8,978,117 B2 | 3/2015 | Bentley et al. | |
| 9,015,482 B2 | 4/2015 | Baghdasaryan et al. | |
| 9,032,485 B2 | 5/2015 | Chu | |
| 9,083,689 B2 | 7/2015 | Lindemann et al. | |
| 9,161,209 B1 | 10/2015 | Ghoshal et al. | |
| 9,171,306 B1 | 10/2015 | He et al. | |
| 9,172,687 B2 | 10/2015 | Baghdasaryan et al. | |
| 9,396,320 B2 | 7/2016 | Lindemann | |
| 2001/0037451 A1 | 11/2001 | Bhagavatula et al. | |
| 2002/0010857 A1 | 1/2002 | Karthik | |
| 2002/0016913 A1 | 2/2002 | Wheeler et al. | |
| 2002/0040344 A1 | 4/2002 | Preiser et al. | |
| 2002/0073316 A1 | 6/2002 | Collins et al. | |
| 2002/0073320 A1 | 6/2002 | Rinkevich et al. | |
| 2002/0087894 A1 | 7/2002 | Foley et al. | |
| 2002/0112170 A1 | 8/2002 | Foley et al. | |
| 2002/0174344 A1 | 11/2002 | Ting | |
| 2002/0174348 A1 | 11/2002 | Ting | |
| 2003/0055792 A1 | 3/2003 | Kinoshita et al. | |
| 2003/0065805 A1 | 4/2003 | Barnes | |
| 2003/0084300 A1 | 5/2003 | Koike | |
| 2003/0087629 A1 | 5/2003 | Juitt | |
| 2003/0115142 A1 | 6/2003 | Brickell et al. | |
| 2003/0135740 A1 | 7/2003 | Talmor et al. | |
| 2003/0152252 A1 | 8/2003 | Kondo et al. | |
| 2003/0226036 A1* | 12/2003 | Bivens et al. | 713/201 |
| 2003/0236991 A1 | 12/2003 | Letsinger | |
| 2004/0101170 A1 | 5/2004 | Tisse et al. | |
| 2004/0123153 A1 | 6/2004 | Wright et al. | |
| 2005/0021964 A1 | 1/2005 | Bhatnagar et al. | |
| 2005/0080716 A1 | 4/2005 | Belyi et al. | |
| 2005/0097320 A1 | 5/2005 | Golan et al. | |
| 2005/0125295 A1 | 6/2005 | Tidwell et al. | |
| 2005/0160052 A1 | 7/2005 | Schneider | |
| 2005/0187883 A1 | 8/2005 | Bishop et al. | |
| 2005/0223236 A1 | 10/2005 | Yamada et al. | |
| 2005/0278253 A1* | 12/2005 | Meek et al. | 705/50 |
| 2006/0026671 A1 | 2/2006 | Potter et al. | |
| 2006/0029062 A1 | 2/2006 | Rao | |
| 2006/0156385 A1 | 7/2006 | Chiviendacz et al. | |
| 2006/0161435 A1 | 7/2006 | Atef et al. | |
| 2006/0161672 A1 | 7/2006 | Jolley et al. | |
| 2006/0282670 A1 | 12/2006 | Karchov | |
| 2007/0005988 A1 | 1/2007 | Zhang et al. | |
| 2007/0077915 A1 | 4/2007 | Black et al. | |
| 2007/0088950 A1 | 4/2007 | Wheeler et al. | |
| 2007/0100756 A1 | 5/2007 | Varma | |
| 2007/0106895 A1 | 5/2007 | Huang et al. | |
| 2007/0107048 A1 | 5/2007 | Halls et al. | |
| 2007/0118883 A1 | 5/2007 | Potter et al. | |
| 2007/0165625 A1 | 7/2007 | Fisner et al. | |
| 2007/0168677 A1 | 7/2007 | Kudo | |
| 2007/0169182 A1 | 7/2007 | Wolfond | |
| 2007/0198435 A1 | 8/2007 | Siegal et al. | |
| 2007/0239980 A1 | 10/2007 | Funayama | |
| 2007/0278291 A1 | 12/2007 | Rans et al. | |
| 2007/0286130 A1 | 12/2007 | Shao et al. | |
| 2008/0005562 A1 | 1/2008 | Sather et al. | |
| 2008/0025234 A1 | 1/2008 | Zhu et al. | |
| 2008/0028453 A1 | 1/2008 | Nguyen et al. | |
| 2008/0034207 A1 | 2/2008 | Cam-Winget et al. | |
| 2008/0046334 A1 | 2/2008 | Lee et al. | |
| 2008/0046984 A1 | 2/2008 | Bohmer et al. | |
| 2008/0049983 A1 | 2/2008 | Miller et al. | |
| 2008/0086759 A1 | 4/2008 | Colson | |
| 2008/0134311 A1 | 6/2008 | Medvinsky | |
| 2008/0141339 A1 | 6/2008 | Gomez et al. | |
| 2008/0172725 A1 | 7/2008 | Fujii et al. | |
| 2008/0209545 A1* | 8/2008 | Asano | H04L 9/3273 726/19 |
| 2008/0232565 A1 | 9/2008 | Kutt et al. | |
| 2008/0235801 A1 | 9/2008 | Soderberg et al. | |
| 2008/0271150 A1 | 10/2008 | Boerger et al. | |
| 2008/0289019 A1 | 11/2008 | Lam | |
| 2008/0289020 A1 | 11/2008 | Cameron et al. | |
| 2008/0313719 A1 | 12/2008 | Kaliski, Jr. et al. | |
| 2008/0320308 A1* | 12/2008 | Kostiainen et al. | 713/171 |
| 2009/0049510 A1 | 2/2009 | Zhang et al. | |
| 2009/0064292 A1* | 3/2009 | Carter et al. | 726/5 |
| 2009/0089870 A1 | 4/2009 | Wahl | |
| 2009/0100269 A1 | 4/2009 | Naccache | |
| 2009/0116651 A1 | 5/2009 | Liang | |
| 2009/0133113 A1* | 5/2009 | Schneider | 726/12 |
| 2009/0138724 A1 | 5/2009 | Chiou et al. | |
| 2009/0138727 A1 | 5/2009 | Campello | |
| 2009/0158425 A1 | 6/2009 | Chan et al. | |
| 2009/0183003 A1 | 7/2009 | Haverinen | |
| 2009/0187988 A1 | 7/2009 | Hulten et al. | |
| 2009/0193508 A1 | 7/2009 | Brenneman et al. | |
| 2009/0196418 A1 | 8/2009 | Tkacik et al. | |
| 2009/0199264 A1 | 8/2009 | Lang | |
| 2009/0204964 A1* | 8/2009 | Foley | G06F 21/53 718/1 |
| 2009/0235339 A1 | 9/2009 | Mennes et al. | |
| 2009/0271618 A1 | 10/2009 | Camenisch et al. | |
| 2009/0271635 A1 | 10/2009 | Liu et al. | |
| 2009/0300714 A1 | 12/2009 | Ahn | |
| 2009/0300720 A1 | 12/2009 | Guo et al. | |
| 2009/0307139 A1 | 12/2009 | Mardikar et al. | |
| 2009/0327131 A1 | 12/2009 | Beenau et al. | |
| 2009/0328197 A1 | 12/2009 | Newell et al. | |
| 2010/0010932 A1 | 1/2010 | Law et al. | |
| 2010/0023454 A1 | 1/2010 | Exton et al. | |
| 2010/0029300 A1 | 2/2010 | Chen | |
| 2010/0042848 A1 | 2/2010 | Rosener | |
| 2010/0062744 A1 | 3/2010 | Ibrahim | |
| 2010/0070424 A1 | 3/2010 | Monk | |
| 2010/0082484 A1 | 4/2010 | Erhart et al. | |
| 2010/0083000 A1 | 4/2010 | Kesanupalli | |
| 2010/0094681 A1 | 4/2010 | Almen et al. | |
| 2010/0105427 A1 | 4/2010 | Gupta | |
| 2010/0107222 A1 | 4/2010 | Glasser | |
| 2010/0114776 A1 | 5/2010 | Weller et al. | |
| 2010/0169650 A1 | 7/2010 | Brickell et al. | |
| 2010/0175116 A1 | 7/2010 | Gum | |
| 2010/0186072 A1 | 7/2010 | Kumar | |
| 2010/0192209 A1 | 7/2010 | Steeves et al. | |
| 2010/0223663 A1 | 9/2010 | Morimoto et al. | |
| 2010/0242088 A1 | 9/2010 | Thomas | |
| 2010/0287369 A1 | 11/2010 | Monden | |
| 2010/0325427 A1 | 12/2010 | Ekberg et al. | |
| 2010/0325684 A1 | 12/2010 | Grebenik et al. | |

(56) References Cited

U.S. PATENT DOCUMENTS

| | | | |
|---|---|---|---|
| 2010/0325711 A1 | 12/2010 | Etchegoyen | |
| 2011/0004933 A1 | 1/2011 | Dickinson et al. | |
| 2011/0022835 A1 | 1/2011 | Schibuk | |
| 2011/0047608 A1 | 2/2011 | Levenberg | |
| 2011/0071841 A1 | 3/2011 | Fomenko et al. | |
| 2011/0078443 A1 | 3/2011 | Greenstein et al. | |
| 2011/0082801 A1 | 4/2011 | Baghdasaryan et al. | |
| 2011/0083016 A1 | 4/2011 | Kesanupalli et al. | |
| 2011/0093942 A1 | 4/2011 | Koster et al. | |
| 2011/0107087 A1* | 5/2011 | Lee et al. | 713/155 |
| 2011/0138450 A1 | 6/2011 | Kesanupalli et al. | |
| 2011/0157346 A1 | 6/2011 | Zyzdryn et al. | |
| 2011/0167154 A1 | 7/2011 | Bush et al. | |
| 2011/0167472 A1 | 7/2011 | Evans et al. | |
| 2011/0191200 A1 | 8/2011 | Bayer et al. | |
| 2011/0197267 A1 | 8/2011 | Gravel et al. | |
| 2011/0219427 A1 | 9/2011 | Hito et al. | |
| 2011/0225431 A1 | 9/2011 | Stufflebeam, Jr. et al. | |
| 2011/0228330 A1 | 9/2011 | Nogawa | |
| 2011/0231911 A1 | 9/2011 | White et al. | |
| 2011/0246766 A1 | 10/2011 | Orsini et al. | |
| 2011/0265159 A1 | 10/2011 | Ronda | |
| 2011/0279228 A1 | 11/2011 | Kumar | |
| 2011/0280402 A1 | 11/2011 | Brahim | |
| 2011/0296518 A1 | 12/2011 | Faynberg et al. | |
| 2011/0307706 A1 | 12/2011 | Fielder | |
| 2011/0307949 A1 | 12/2011 | Ronda | |
| 2011/0313872 A1 | 12/2011 | Carter et al. | |
| 2011/0314549 A1 | 12/2011 | Song et al. | |
| 2011/0320823 A1 | 12/2011 | Saroiu et al. | |
| 2012/0018506 A1 | 1/2012 | Hammad et al. | |
| 2012/0023568 A1* | 1/2012 | Cha | G06F 21/335 726/10 |
| 2012/0046012 A1 | 2/2012 | Forutanpour et al. | |
| 2012/0075062 A1 | 3/2012 | Osman et al. | |
| 2012/0084566 A1 | 4/2012 | Chin et al. | |
| 2012/0102553 A1 | 4/2012 | Hsueh et al. | |
| 2012/0124639 A1 | 5/2012 | Shaikh et al. | |
| 2012/0124651 A1 | 5/2012 | Ganesan | |
| 2012/0144461 A1 | 6/2012 | Rathbun | |
| 2012/0159577 A1 | 6/2012 | Belinkiy | |
| 2012/0191979 A1 | 7/2012 | Feldbau | |
| 2012/0203906 A1 | 8/2012 | Jaudon et al. | |
| 2012/0204032 A1 | 8/2012 | Wilkings et al. | |
| 2012/0210135 A1 | 8/2012 | Panchapakesan et al. | |
| 2012/0249298 A1 | 10/2012 | Sovio et al. | |
| 2012/0272056 A1 | 10/2012 | Ganesan | |
| 2012/0278873 A1 | 11/2012 | Calero et al. | |
| 2012/0291114 A1 | 11/2012 | Poliashenko et al. | |
| 2012/0313746 A1 | 12/2012 | Rahman et al. | |
| 2012/0317297 A1 | 12/2012 | Bailey | |
| 2013/0042327 A1 | 2/2013 | Chow | |
| 2013/0046976 A1 | 2/2013 | Rosati et al. | |
| 2013/0046991 A1 | 2/2013 | Lu et al. | |
| 2013/0054967 A1 | 2/2013 | Davoust et al. | |
| 2013/0061055 A1 | 3/2013 | Schibuk | |
| 2013/0067546 A1 | 3/2013 | Thavasi et al. | |
| 2013/0073859 A1 | 3/2013 | Carlson et al. | |
| 2013/0086669 A1 | 4/2013 | Sondhi et al. | |
| 2013/0090939 A1 | 4/2013 | Robinson et al. | |
| 2013/0097682 A1 | 4/2013 | Zeljkovic | |
| 2013/0104187 A1 | 4/2013 | Weidner | |
| 2013/0104190 A1 | 4/2013 | Simske et al. | |
| 2013/0119130 A1 | 5/2013 | Braams | |
| 2013/0124285 A1 | 5/2013 | Pravetz et al. | |
| 2013/0124422 A1 | 5/2013 | Hubert et al. | |
| 2013/0125197 A1 | 5/2013 | Pravetz | |
| 2013/0125222 A1 | 5/2013 | Pravetz et al. | |
| 2013/0133049 A1 | 5/2013 | Peirce | |
| 2013/0133054 A1 | 5/2013 | Davis et al. | |
| 2013/0144785 A1 | 6/2013 | Karpenko et al. | |
| 2013/0159413 A1 | 6/2013 | Davis et al. | |
| 2013/0159716 A1 | 6/2013 | Buck et al. | |
| 2013/0160083 A1 | 6/2013 | Schrix et al. | |
| 2013/0167196 A1 | 6/2013 | Spencer et al. | |
| 2013/0219456 A1 | 8/2013 | Sharma et al. | |
| 2013/0227646 A1 | 8/2013 | Haggerty et al. | |
| 2013/0239173 A1 | 9/2013 | Dispensa | |
| 2013/0282589 A1 | 10/2013 | Shoup et al. | |
| 2013/0308778 A1 | 11/2013 | Fosmark et al. | |
| 2013/0318343 A1 | 11/2013 | Bjarnason et al. | |
| 2013/0337777 A1* | 12/2013 | Deutsch et al. | 455/411 |
| 2013/0346176 A1 | 12/2013 | Alolabi et al. | |
| 2014/0002238 A1 | 1/2014 | Taveau et al. | |
| 2014/0007215 A1 | 1/2014 | Romano | |
| 2014/0013422 A1 | 1/2014 | Janus et al. | |
| 2014/0033271 A1 | 1/2014 | Barton et al. | |
| 2014/0040987 A1 | 2/2014 | Haugsnes | |
| 2014/0044265 A1* | 2/2014 | Kocher et al. | 380/277 |
| 2014/0047510 A1 | 2/2014 | Belton et al. | |
| 2014/0066015 A1* | 3/2014 | Aissi | 455/411 |
| 2014/0068746 A1 | 3/2014 | Gonzalez | |
| 2014/0075516 A1 | 3/2014 | Chermside | |
| 2014/0089243 A1 | 3/2014 | Oppenheimer | |
| 2014/0096182 A1* | 4/2014 | Smith | 726/1 |
| 2014/0101439 A1 | 4/2014 | Pettigrew et al. | |
| 2014/0109174 A1 | 4/2014 | Barton | |
| 2014/0115702 A1 | 4/2014 | Li et al. | |
| 2014/0130127 A1 | 5/2014 | Toole et al. | |
| 2014/0137191 A1 | 5/2014 | Goldsmith et al. | |
| 2014/0164776 A1 | 6/2014 | Hook et al. | |
| 2014/0173754 A1* | 6/2014 | Barbir | 726/28 |
| 2014/0188770 A1 | 7/2014 | Agrafioti et al. | |
| 2014/0189350 A1 | 7/2014 | Baghdasaryan | |
| 2014/0189360 A1 | 7/2014 | Baghdasaryan | |
| 2014/0189779 A1 | 7/2014 | Baghdasaryan | |
| 2014/0189791 A1 | 7/2014 | Lindemann | |
| 2014/0189807 A1* | 7/2014 | Cahill et al. | 726/4 |
| 2014/0189808 A1 | 7/2014 | Mahaffey et al. | |
| 2014/0189828 A1 | 7/2014 | Baghdasaryan | |
| 2014/0189835 A1 | 7/2014 | Umerley | |
| 2014/0201809 A1 | 7/2014 | Choyi et al. | |
| 2014/0230032 A1 | 8/2014 | Duncan | |
| 2014/0245391 A1 | 8/2014 | Adenuga | |
| 2014/0250523 A1 | 9/2014 | Savvides et al. | |
| 2014/0258125 A1 | 9/2014 | Gerber et al. | |
| 2014/0258711 A1 | 9/2014 | Brannon | |
| 2014/0282868 A1 | 9/2014 | Sheller et al. | |
| 2014/0282945 A1* | 9/2014 | Smith et al. | 726/6 |
| 2014/0282965 A1 | 9/2014 | Sambamurthy et al. | |
| 2014/0289117 A1 | 9/2014 | Baghdasaryan | |
| 2014/0289820 A1 | 9/2014 | Lindemann et al. | |
| 2014/0289833 A1 | 9/2014 | Briceno et al. | |
| 2014/0289834 A1 | 9/2014 | Lindemann | |
| 2014/0298419 A1 | 10/2014 | Boubez | |
| 2014/0304505 A1 | 10/2014 | Dawson | |
| 2015/0046340 A1 | 2/2015 | Dimmick | |
| 2015/0058931 A1 | 2/2015 | Miu et al. | |
| 2015/0095999 A1 | 4/2015 | Toth et al. | |
| 2015/0134330 A1 | 5/2015 | Baldwin et al. | |
| 2015/0142628 A1 | 5/2015 | Suplee et al. | |
| 2015/0180869 A1 | 6/2015 | Verma | |
| 2015/0244696 A1 | 8/2015 | Ma | |
| 2015/0269050 A1 | 9/2015 | Filimonov | |
| 2015/0326529 A1 | 11/2015 | Morita | |
| 2015/0381580 A1 | 12/2015 | Graham et al. | |
| 2016/0036588 A1 | 2/2016 | Thackston | |
| 2016/0072787 A1 | 3/2016 | Balabine et al. | |
| 2016/0078869 A1 | 3/2016 | Syrdal et al. | |
| 2016/0087952 A1 | 3/2016 | Tartz et al. | |
| 2016/0087957 A1 | 3/2016 | Shah et al. | |
| 2016/0188958 A1 | 6/2016 | Martin | |
| 2017/0004487 A1 | 1/2017 | Hagen et al. | |
| 2017/0109751 A1 | 4/2017 | Dunkelberger et al. | |

FOREIGN PATENT DOCUMENTS

| | | |
|---|---|---|
| WO | 2005003985 A1 | 1/2005 |
| WO | WO2013/082190 | 6/2013 |

(56) References Cited

FOREIGN PATENT DOCUMENTS

| | | |
|---|---|---|
| WO | 2014105994 A2 | 7/2014 |
| WO | 2015130734 A1 | 9/2015 |

OTHER PUBLICATIONS

Kim, "Secure user authentication based on the Trusted Platform for mobile devices", Sep. 29, 2016, EURASIP Journal on Wireless Communications & Networking, pg. 1-15.*

Martins, "A Potpourri of authentication mechanisms the mobile device way", Jan. 2013, CISTI, pg. 843-848.*

Anthony J. Nicholson, "Mobile Device Security Using Transient Authentication," IEEE Transactions on Mobile Computing vol. 5, No. 11, pp. 1489-1502 (Nov. 2006).

Mohammad O. Derawi, "Unobtrusive User-Authentication on Mobile Phones using Biometric Gait Recognition" (2010).

Koichiro Niinuma, Anil K. Jain, "Continuous User Authentication Using Temporal Information" (currently at http://www.cse.msu.edu/biometrics/Publications/Face/NiinumaJain_ContinuousAuth_SPIE10.pdf).

BehavioSec, "Measuring FAR/FRR/EER in Continuous Authentication," Stockholm, Sweden (2009).

The Online Certificate Status Protocol (OCSP, RFC2560).

See current WikiPedia article for "Eye Tracking" at en.wikipedia.org/wiki/Eye_tracking.

(See Hartzell, "Crazy Egg Heatmap Shows Where People Click on Your Website" (Nov. 30, 2012), currently at www.michaelhartzell.com/Blog/bid/92970/Crazy-Egg-Heatmap-shows-where-people-click-on-your-website).

Notification of Transmittal of the International Search Report and the Written Opinion from counterpart Patent Cooperation Treaty Application No. PCT/US13/77888, mailed Aug. 8, 2014, 10 pages.

Notification of Transmittal of the International Search Report and the Written Opinion from counterpart Patent Cooperation Treaty Application No. PCT/US14/39627, mailed Oct. 16, 2014, 3 pages.

Notification of Transmittal of the International Search Report and the Written Opinion from counterpart Patent Cooperation Treaty Application No. PCT/US14/31344, mailed Nov. 3, 2014, 8 pages.

Office Action from U.S. Appl. No. 14/145,439, mailed Feb. 12, 2015, 18 pages.

Office Action from U.S. Appl. No. 14/145,533, mailed Jan. 26, 2015, 13 pages.

Office Action from U.S. Appl. No. 14/145,607, mailed Mar. 20, 2015, 22 pages.

Office Action from U.S. Appl. No. 14/218,551, mailed Apr. 23, 2015, 9 pages.

Office Action from U.S. Appl. No. 14/218,575, mailed Feb. 10, 2015, 17 pages.

Office Action from U.S. Appl. No. 14/066,273, mailed May 8, 2015, 31 pages.

Notice of Allowance from U.S. Appl. No. 14/145,533, mailed May 11, 2015, 5 pages.

Notice of Allowance from U.S. Appl. No. 14/145,439, mailed Jul. 6, 2015, 6 pages.

Transmittal of International Preliminary Report on Patentability from foreign counterpart PCT/US2013/077888, mailed Jul. 9, 2015, 7 pages.

Office Action from U.S. Appl. No. 14/268,733, mailed Jul. 16, 2015, 13 pages.

Notification of Transmittal of the International Search Report and the Written Opinion from counterpart Patent Cooperation Treaty Application No. PCT/US2015/028924, mailed Jul. 30, 2015, 10 pages.

Office Action from U.S. Appl. No. 14/218,575, mailed Aug. 7, 2015, 19 pages.

Office Action from U.S. Appl. No. 14/268,619, mailed Aug. 24, 2015, 17 pages.

Notice of Allowance from U.S. Appl. No. 14/145,607, mailed Sep. 2, 2015, 19 pages.

Final Office Action from U.S. Appl. No. 14/218,551, mailed Sep. 9, 2015, 15 pages.

Notice of Allowance from U.S. Appl. No. 14/145,533, mailed Sep. 14, 2015, 13 pages.

Notice of Allowance from U.S. Appl. No. 14/448,697, mailed Sep. 15, 2015, 14 pages.

Notification of Transmittal of the International Search Report and the Written Opinion from counterpart Patent Cooperation Treaty Application No. PCT/US2015/042785, mailed Oct. 16, 2015, 8 pages.

Notification of Transmittal of the International Search Report and the Written Opinion from counterpart Patent Cooperation Treaty Application No. PCT/US2015/042799, mailed Oct. 19, 2015, 13 pages.

Notice of Allowance from U.S. Appl. No. 14/268,686, mailed Nov. 5, 2015, 23 pages.

Office Action from U.S. Appl. No. 14/448,641, mailed Nov. 9, 2015, 21 pages.

Barker et al; "Recommendation for key management Part 3: Application—Specific Key Management Guidance"; NIST special Publication 800-57, pp. 1-103, Dec. 2009.

Office Action from U.S. Appl. No. 14/448,814, mailed Aug. 4, 2015, 13 pages.

World Wide Web Consortium, W3C Working Draft: Media Capture and Streams (2013).

Office Action from U.S. Appl. No. 14/218,692, mailed Nov. 4, 2015, 16 pages.

Notice of Allowance from U.S. Appl. No. 14/145,439, mailed Oct. 28, 2015, 12 pages.

Brickell, Ernie, Jan Camenisch, and Liqun Chen. "Direct anonymous attestation." *Proceedings of the 11th ACM conference on Computer and communications security*. ACM, 2004, 6 pages.

Chen, Liqun, and Jiangtao Li. "Flexible and scalable digital signatures in TPM 2.0." *Proceedings of the 2013 ACM SIGSAC conference on Computer & communications security*. ACM, 2013.

Chakka, Murali Mohan, et al. "Competition on counter measures to 2-d facial spoofing attacks." *Biometrics (IJCB), 2011 International Joint Conference on*. IEEE, 2011, 6 pages.

Marcialis, Gian Luca, et al. "First international fingerprint liveness detection competition—livdet 2009." *Image Analysis and Processing—ICIAP 2009*. Springer Berlin Heidelberg, 2009. 12-23.

Uludag, Umut, and Anil K. Jain. "Attacks on biometric systems: a case study in fingerprints." *Electronic Imaging 2004*. International Society for Optics and Photonics, 2004, 12 pages.

Ratha, Nalini K., Jonathan H. Connell, and Ruud M. Bolle. "An analysis of minutiae matching strength." *Audio-and Video-Based Biometric Person Authentication*. Springer Berlin Heidelberg, 2001, 7 pages.

Schneier, B., "Biometrics: Uses and Abuses". Aug. 1999. Inside Risks 110 (CACM 42, 8, Aug. 1999). http://www.schneier.com/essay-019.pdf.

Zhao, W., et al. "Face Recognition: A Literature Survey". ACM Computing Surveys, vol. 35, No. 4. Dec. 2003, pp. 399-458.

Abate, A., et al., "2D and 3D face recognition: A survey". Pattern Recognition Letters. 2007, 28, pp. 1885-1906.

GSM Arena. GSM Arena. [Online] Nov. 13, 2011. [Cited: Sep. 29, 2012.] http://www.gsmarena.com/ice_cream_sandwichs_face_unlock_duped_using_a_photograph-news-3377.php. Downloaded Aug. 18, 2015.

Wilson, R., James. Unbuntu Life, "How to Trick Google's New Face Unlock on Android 4.1 Jelly Bean". Print Screen Mac. [Online] Aug. 6, 2012. [Cited: Sep. 28, 2012.] http://printscreenmac.info/how-to-trick-android-jelly-bean-face-unlock/. downloaded Aug. 13, 2015.

Phillips, P., J., et al., "Face Recognition Vendor Test 2002: Evaluation Report". s.l. : NISTIR 6965, 2002. 56 pages. http://www.face-rec.org/vendors/FRVT_2002_Evaluation_Report.pdf.

Phillips, P.J., et al., "FRVT 2006 and ICE 2006 Large-Scale Results", NIST IR 7408. Gaithersburg : NIST, 2006. Mar. 29, 2007. pp. 1-55.

Grother, P.J., et al., NIST. Report on the Evaluation of 2D Still-Image Face Recognition Algorithms, NIST IR 7709. s.l. : NIST, 2011. Jun. 22, 2010. pp. 1-58.

(56) References Cited

OTHER PUBLICATIONS

Roberts, C., "Biometric Attack Vectors and Defences". Sep. 2006. 25 pages. http://otago.ourarchive.ac.nz/bitstream/handle/10523/1243/BiometricAttackVectors.pdf.
Pinto, A., et al., "Video-Based Face Spoofing Detection through Visual Rhythm Analysis". Los Alamitos : IEEE Computer Society Conference Publishing Services, 2012. Conference on Graphics, Patterns and Images, 25. 8 pages.(SIBGRAPI). http://sibgrapi.sid.inpe.br/rep/sid.inpe.br/sibgrapi/2012/07.13.21.16?mirror=sid.inpe.br/banon/2001/03.30.15.38.24&metadatarepository=sid.inpe.br/sibgrapi/2012/07.13.21.16.53.
Li, J., et al., "Live Face Detection Based on the Analysis of Fourier Spectra". Biometric Technology for Human Identification. 2004, pp. 296-303.
Tan, X., et al., "Face Liveness Detection from a Single Image with Sparse Low Rank Bilinear Discriminative Model". s.l. : European Conference on Computer Vision, 2010. pp. 1-14.
Määttä, J., et al., "Machine Vision Group, University of Oulu", Finland. "Face Spoofing Detection From Single Images Using Micro-Texture Analysis". Oulu, Finland : IEEE, 2011. pp. 1-7. http://www.ee.oulu.fi/research/mvmp/mvg/files/pdf/131.pdf.
Heikkilä, M., et al., "A Texture-Based Method for Modeling the Background and Detecting Moving Objects". Oulu : IEEE, Jun. 22, 2005. DRAFT. 16 pages. http://www.ee.oulu.fi/mvg/files/pdf/pdf_662.pdf.
Peng, Y., et al. "RASL: Robust Alignment by Sparse and Low-rank Decomposition for Linearly Correlated Images". IEEE Conference on Computer Vision and Pattern Recognition. 2010, pp. 763-770. http://yima.csl.illinois.edu/psfile/RASL_CVPR10.pdf.
Kong, S., et al., "Recent advances in visual and infrared face recognition"—a review. Journal of Computer Vision and Image Understanding. Jun. 2005, vol. 1, 97, pp. 103-135.
Kollreider, K., et al., Halmstad University, SE-30118, Sweden. Evaluating Liveness by Face Images and the Structure Tensor. Halmstad, Sweden : s.n., 2005. http://citeseerx.ist.psu.edu/viewdoc/download?doi=10.1.1.62.6534&rep=rep1&type=pdf.
Smiatacz, M., et al., Gdansk University of Technology. Liveness Measurements Using Optical Flow for Biometric Person Authentication. Metrology and Measurement Systems. 2012, vol. XIX, 2. pp. 257-268.
Bao, W., et al., et al.,"A liveness detection method for face recognition based on optical flow field". Image Analysis and Signal Processing, IASP 2009. Apr. 11-12, 2009, pp. 233-236. http://ieeexplore.ieee.org/stamp/stamp.jsp?tp=&arnumber=5054589&isnumber=5054562.
Pan, G., et al., "Liveness Detection for Face Recognition". Recent Advances in Face Recognition. Vienna : I-Tech, 2008, Ch. 9, pp. 109-124, ISBN: 978-953-7619-34-3.
National Science & Technology Council's Subcommittee on Biometrics. Biometrics Glossary. 33 pages, Last updated Sep. 14, 2006. NSTC. http://www.biometrics.gov/documents/glossary.pdf.
Ross, A., et al. "Multimodal Biometrics: An Overview". Proceedings of 12th European Signal Processing Conference (EUSIPCO). Sep. 2004, pp. 1221-1224. http://www.csee.wvu.edu/~ross/pubs/RossMultimodalOverview_EUSIPCO04.pdf.
Rodrigues, R.N., et al. Robustness of multimodal biometric fusion methods against spoof attacks. Journal of Visual Language and Computing. 2009. 11 pages, doi:10.1016/j.jvlc.2009.01.010; http://cubs.buffalo/edu/govind/papers/visual09.pdf.
Akhtar, Z., et al., "Spoof Attacks on Multimodal Biometric Systems". Alfarid. Singapore : IACSIT Press, Singapore, 2011. 2011 International Conference on Information and Network Technology IPCSIT. vol. 4. pp. 46-51. http://www.ipcsit.com/vol4/9-ICINT2011T046.pdf.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] http://eyetools.com/articles/p3-understanding-eye-tracking-what-is-a-heatmap-really.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Lubin, G., et al., Business Insider. "16 Heatmaps That Reveal Exactly Where People Look". [Online] May 21, 2012. [Cited: Nov. 1, 2012.] pges 1-21. http://www.businessinsider.com/eye-tracking-heatmaps-2012-5?op=1.
Huang, L., et al., "Clickjacking: Attacks and Defenses". s.l. : Usenix Security 2012, pp. 1-16, 2012. https://www.usenix.org/system/files/conference/usenixsecurity12/sec12-final39.pdf.
Willis, N., Linux.com. Weekend Project: Take a Tour of Open Source Eye-Tracking Software. [Online] Mar. 2, 2012. [Cited: Nov. 1, 2012.] https://www.linux.com/learn/tutorials/550880-weekend-project-take-a-tour-of-open-source-eye-tracking-software.
Chetty, G. School of ISE, University of Canberra, Australia. "Multilevel liveness verification for face-voice biometric authentication". BYSM-2006 Symposium. Baltimore: BYSM-Symposium, 9 pages. Sep. 19, 2006. http://www.biometrics.org/bc2006/presentations/Tues_Sep_19/BSYM/19_Chetty_research.pdf.
Tresadern, P., et al., "Mobile Biometrics (MoBio): Joint Face and Voice Verification for a Mobile Platform". 2012. http://personal.ee.surrey.ac.uk/Personal/Norman.Poh/data/tresadern_PervComp2012_draft.pdf.
Jafri, R., et al., "A Survey of Face Recognition Techniques. Journal of Information Processing Systems", vol. 5, No. 2, Jun. 2009. Jun. 2009, vol. 5, 2, pp. 41-68. http://www.cosy.sbg.ac.at/~uhl/face_recognition.pdf.
Himanshu, et al., "A Review of Face Recognition". International Journal of Research in Engineering & Applied Sciences. Feb. 2012, vol. 2, 2, pp. 835-846. http://euroasiapub.org/IJREAS/Feb2012/81.pdf.
Phillips, P. J., et al., "Biometric Image Processing and Recognition". Chellappa. 1998. Eusipco .8 pages.
Zhou, et al., "Face Recognition from Still Images and Videos". University of Maryland, College Park, MD 20742. Maryland : s.n., Nov. 5, 2004.pp. 1-23, http://citeseerx.ist.psu.edu/viewdoc/download?doi=10.1.1.77.1312&rep=rep1&type=pdf.
Quinn, G.W., et al., NIST. "Performance of Face Recognition Algorithms on Compressed Images", NIST Inter Agency Report 7830. s.l. : NIST, Dec. 4, 2011.
The Extended M2VTS Database. [Online] [Cited: Sep. 29, 2012.] downloaded Jan. 28, 2015, 1 page; http://www.ee.surrey.ac.uk/CVSSP/xm2vtsdb/.
Ratha, N. K., et al., IBM. "Enhancing security and privacy in biometrics-based authentication systems". IBM Systems Journal. 2001, vol. 40, 3. pp. 614-634.
Schuckers, S., Schuckers SAC. "Spoofing and Anti-Spoofing Measures". Information Security Technical Report. Dec. 10, 2002, vol. 7, 4., pp. 56-62.
Schwartz, W., et al., "Face Spoofing Detection through Partial Least Squares and Low-Level Descriptors". s.l. : Intl. Joint Conference on Biometrics,, 2011. pp. 1-8.
Edited by Kresimir Delac, Mislay Grgic and Marian Stewart Bartlett. s.l. : InTech, Jun. 1, 2008. http://cdn.intechopen.com/finals/81/InTech-Recent_advances_in_face_recognition.zip. ISBN 978-953-7619-34-3. Uploaded as Chapters 1-15.
Pan, G., et al., "Monocular camera-based face liveness detection by combining eyeblink and scene context" pp. 215-225. s.l. : Springer Science+Business Media, LLC, Aug. 4, 2010. http://www.cs.zju.edu.cn/~gpan/publication/2011-TeleSys-liveness.pdf.
Tronci, R, et al., "Fusion of multiple clues for photo-attack detection in face recognition systems". 09010 Pula (CA), Italy : s.n., 2011. pp. 1-6. http://prag.diee.unica.it/pra/system/files/Amilab_IJCB2011.pdf.
Rocha, A., et al., "Vision of the Unseen: Current Trends and Challenges in Digital Image and Video Forensics". s.l. : ACM Computing Surveys, 2010. http://www.wjscheirer.com/papers/wjs_csur2011_forensics.pdf.
Linux.com, The source for Linux information. 2012. 3 pages, downloaded Jan. 28, 2015.

(56) References Cited

OTHER PUBLICATIONS

Kollreider, K., et al., "Non-instrusive liveness detection by face images". Image Vis. Comput. (2007). doi:10.1016/j.imavis.2007.05.004, 12 pages.
Notification of Transmittal of the International Search Report and the Written Opinion from counterpart Patent Cooperation Treaty Application No. PCT/US2015/042870, mailed Oct. 30, 2015, 9 pages.
Notification of Transmittal of the International Search Report and the Written Opinion from counterpart Patent Cooperation Treaty Application No. PCT/US2015/42827, mailed Oct. 30, 2015, 9 pages.
Validity, OSTP Framework, 24 pages, 2010.
Notification of Transmittal of the International Search Report and the Written Opinion from counterpart Patent Cooperation Treaty Application No. PCT/US15/50348, mailed Dec. 22, 2015, 9 pages.
Office Action from U.S. Appl. No. 14/448,868, mailed Dec. 3, 2015, 15 pages.
Office Action from U.S. Appl. No. 14/487,992, mailed Dec. 31, 2015, 12 pages.
Final Office Action from U.S. Appl. No. 14/268,619, mailed Dec. 14, 2015, 10 pages.
Notification of Transmittal of International Search Report and Written Opinion from PCT/US2015/028927, mailed Jul. 30, 2015, 12 page.
Transmittal of International Preliminary Report on Patentability from foreign counterpart PCT Patent Application No. PCT/US2014/039627 mailed Dec. 10, 2015, 8 pages.
Notice of Allowance from U.S. Appl. No. 14/448,697, mailed Jan. 14, 2016, 23 pages.
Final Office Action from U.S. Appl. No. 14/268,733, mailed Jan. 15, 2016, 14 pages.
Notice of Allowance from U.S. Appl. No. 14/145,533, mailed Jan. 20, 2016, 12 pages.
Office Action from U.S. Appl. No. 14/218,743, mailed Jan. 21, 2016, 12 pages.
Office Action from U.S. Appl. No. 14/218,551, mailed Jan. 21, 2016, 11 pages.
Office Action from U.S. Appl. No. 14/218,575, mailed Jan. 29, 2016, 25 pages.
Advisory Action from U.S. Appl. No. 13/730,791 dated Jan. 23, 2015, 4 pages.
Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.
Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.
Doherty, et al., Internet Engineering Task Force (IETF), "Dynamic Symmetric Key Provisioning Protocol (DSKPP)", Dec. 2010, 105 pages.
Edited by Kresimir Delac, Mislay Grgic and Madan Stewart Bartlett. s.l. : InTech Jun. 1, 2008. http://cdn.intechopen.com/finals/81/InTech-Recent_advances_in_face_recognition.zip. ISBN 978-953-7619-34-3. Uploaded as Chapters 1-15.
Extended European Search Report for Application No. 13867269, dated Nov. 34, 2016, 10 pages.
Final Office Action from U.S. Appl. No. 13/730,761 dated Jan. 15, 2015, 31 pages.
Final Office Action from U.S. Appl. No. 13/730,761 dated Jul. 8, 2014, 36 pages.
Final Office Action from U.S. Appl. No. 13/730,776 dated Nov. 3, 2014, 20 pages.
Final Office Action from U.S. Appl. No. 13/730,780 dated Jan. 27, 2015, 30 pages.
Final Office Action from U.S. Appl. No. 13/730,780 dated May 12, 2014, 34 pages.
Final Office Action from U.S. Appl. No. 13/730,791 dated Nov. 13, 2014, 22 pages.
Final Office Action from U.S. Appl. No. 13/730,795 dated Aug. 14, 2014, 20 pages.
Final Office Action from U.S. Appl. No. 14/066,273 dated Feb. 11, 2016, 29 pages.
Final Office Action from U.S. Appl. No. 14/218551 dated Sep. 16, 2016, 11 pages.
Final Office Action from U.S. Appl. No. 14/218,575 dated Jul. 7, 2016, 29 pages.
Final Office Action from U.S. Appl. No. 14/218,646 dated Aug. 11, 2016, 25 pages.
Final Office Action from U.S. Appl. No. 14/218,692 dated Mar. 2, 2016,.
Final Office Action from U.S. Appl. No. 14/448,814 dated Feb. 16, 2016, 14 pages.
Final Office Action from U.S. Appl. No. 14/448,814 dated Jun. 14, 2016, 17 pages.
Final Office Action from U.S. Appl. No. 14/448,868 dated Aug. 19, 2016, 11 pages.
International Preliminary Report on Patentability for Application No. PCT/US2015/028924 dated Nov. 17, 2016, 9 pages.
International Preliminary Report on Patentability for Application No. PCT/US2015/028927 dated Nov. 17, 2016, 10 pages.
Non-Final Office Action from U.S. Appl. No. 13/730,761 dated Feb. 27, 2014, 24 pages.
Non-Final Office Action from U.S. Appl. No. 13/730,761 dated Sep. 9, 2014, 36 pages.
Non-Final Office Action from U.S. Appl. No. 13/730,776 dated Jul. 15, 2014, 16 pages.
Non-Final Office Action from U.S. Appl. No. 13/730,780 dated Aug. 4, 2014, 30 pages.
Non-Final Office Action from U.S. Appl. No. 13/730,780 dated Mar. 12, 2014, 22 pages.
Non-Final Office Action from U.S. Appl. No. 13/730,791 dated Jun. 27, 2014, 17 pages.
Non-Final Office Action from U.S. Appl. No. 13/730,795 dated Jan. 5, 2015, 19 pages.
Non-Final Office Action from U.S. Appl. No. 13/730,795 dated Jun. 11, 2014, 14 pages.
Non-Final Office Action from U.S. Appl. No. 14/066,273 dated Jun. 16, 2016, 43 pages.
Non-Final Office Action from U.S. Appl. No. 14/145,466 dated Sep. 9, 2016, 13 pages.
Non-Final Office Action from U.S. Appl. No. 14/218,551 dated May 12, 2016, 11 pages.
Non-Final Office Action from U.S. Appl. No. 14/218,611 dated Jun. 16, 2016, 13 pages.
Non-Final Office Action from U.S. Appl. No. 14/218,646 dated Mar. 10, 2016, 23 pages.
Non-Final Office Action from U.S. Appl. No. 14/218,677 dated Aug. 2, 2016, 15 pages.
Non-Final Office Action from U.S. Appl. No. 14/218,692 dated Oct. 25, 2016, 33 pages.
Non-Final Office Action from U.S. Appl. No. 14/218,743 dated Aug. 19, 2016, 11 pages.
Non-Final Office Action from U.S. Appl. No. 14/268,619 dated Mar. 21, 2016, 7 pages.
Non-Final Office Action from U.S. Appl. No. 14/448,747 dated Aug. 19, 2016, 21 pages.
Non-Final Office Action from U.S. Appl. No. 14/448,868 dated Dec. 31, 2015, 12 pages.
Non-Final Office Action from U.S. Appl. No. 14/487,992 dated Dec. 3, 2015, 15 pages.
Non-Final Office Action from U.S. Appl. No. 14/859,328 dated Sep. 15, 2016, 39 pages.
Notice of Allowance from U.S. Appl. No. 14/487,992 dated May 12, 2016, 11 pages.
Notice of Allowance from U.S. Appl. No. 13/730,761 dated Jun. 10, 2015, 15 pages.
Notice of Allowance from U.S. Appl. No. 13/730,761 dated Sep. 28, 2015, 5 pages.

(56) References Cited

OTHER PUBLICATIONS

Notice of Allowance from U.S. Appl. No. 13/730,776 dated Feb. 13, 2015, 16 pages.
Notice of Allowance from U.S. Appl. No. 13/730,776 dated Mar. 24, 2015, 3 pages.
Notice of Allowance from U.S. Appl. No. 13/730,780 dated Aug. 13, 2015, 13 pages.
Notice of Allowance from U.S. Appl. No. 13/730,791 dated Mar. 10, 2015, 17 pages.
Notice of Allowance from U.S. Appl. No. 13/730,795 dated Jan. 14, 2016, 11 pages.
Notice of Allowance from U.S. Appl. No. 13/730,795 dated May 15, 2015, 8 pages.
Notice of Allowance from U.S. Appl. No. 13/730,795 dated Sep. 17, 2015, 11 pages.
Notice of Allowance from U.S. Appl. No. 14/145,439 dated Mar. 14, 2016, 17 pages.
Notice of Allowance from U.S. Appl. No. 14/145,607 dated Feb. 1, 2016, 28 pages.
Notice of Allowance from U.S. Appl. No. 14/268,619 dated Oct. 3, 2016, 65 pages.
Notice of Allowance from U.S. Appl. No. 14/268,619 dated Jul. 19, 2016, 5 pages.
Notice of Allowance from U.S. Appl. No. 14/268,686 dated Apr. 18, 2016, 16 pages.
Notice of Allowance from U.S. Appl. No. 14/268,686 dated Jul. 8, 2016, 4 pages.
Notice of Allowance from U.S. Appl. No. 14/268,686 dated Mar. 30, 2016, 38 pages.
Notice of Allowance from U.S. Appl. No. 14/268,733 dated Sep. 23, 2016, 8 pages.
Notice of Allowance from U.S. Appl. No. 14/448,641 dated Jun. 7, 2016, 13 pages.
Notice of Allowance from U.S. Appl. No. 14/448,697 dated May 20, 2016, 14 pages.
Notice of Allowance from U.S. Appl. No. 14/448,697 dated Sep. 1, 2016, 3 pages.
Notice of Allowance from U.S. Appl. No. 14/487,992 dated Sep. 6, 2016, 26 pages.
Notification of Transmittal of the International Search Report and the Written Opinion from counterpart Patent cooperation Treaty Application No. PCT/US2015/042786, dated Oct. 16, 2015, 3 pages.
Notification of Transmittal of the International Search Report and the Written Opinion from counterpart Patent cooperation Treaty Application No. PCT/US2015/42783, dated Oct. 19, 2015, 13 pages.
Requirement for Restriction/Election from U.S. Appl. No. 14/218,504 dated Aug. 16, 2016, 11 pages.
Supplementary Partial European Search Report for Application No. 13867269, dated Aug. 3, 2016, 7 pages.
T. Weigold et al., "The Zurich Trusted Information Channel-An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.
Transmittal of International Preliminary Report on Patentability from foreign counterpart PCT Patent Application No. PCT/US2014/031344 dated Oct. 1, 2015, 9 pages.
Vassilev, A.T.; du Castel, B.; Ali, A.M., "Personal Brokerage of Web Service Access," Security & Privacy, IEEE, vol. 5, No. 5, pp. 24-31, Sep.-Oct. 2007.
Communication pursuant to Rules 161(2) and 162 EPC for EP Application No. 15826364.0, dated Mar. 7, 2017, 2 pages.
Extended European Search Report for Application No. 14803988.6, dated Dec. 23, 2016, 10 pages.
Extended European Search Report from European Patent Application No. 14770682.4, dated Jan. 17, 2017, 14 pages.
Final Office Action from U.S. Appl. No. 14/066,273, dated Jan. 10, 2017, 24 pages.
Final Office Action from U.S. Appl. No. 14/145,466, dated Apr. 13, 2017, 61 pages.
Final Office Action from U.S. Appl. No. 14/218,611, dated Jan. 27, 2017, 14 pages.
Final Office Action from U.S. Appl. No. 14/218,692, dated Feb. 28, 2017, 27 pages.
Final Office Action from U.S. Appl. No. 14/218,743, dated Mar. 3, 2017, 67 pages.
Final Office Action from U.S. Appl. No. 14/448,747, dated Feb. 13, 2017, 74 pages.
Final Office Action from U.S. Appl. No. 14/859,328, dated Mar. 6, 2017, 26 pages.
Julian J., et al., "Biometric Enabled Portable Trusted Computing Platform," Trust Security and Privacy Communications (TRUSTCOM), 2011 IEEE 10th International Conference on Nov. 16, 2011, pp. 436-442, XP032086831, DOI:10.1109/TRUSTCOM.2011.56, ISBN: 978-1-4577-2135-9.
Non-Final Office Action from U.S. Appl. No. 14/066,273, dated May 18, 2017, 46 pages.
Non-Final Office Action from U.S. Appl. No. 14/218,504, dated Feb. 27, 2017, 12 pages.
Non-Final Office Action from U.S. Appl. No. 14/218,575, dated May 4, 2017, 88 pages.
Non-Final Office Action from U.S. Appl. No. 14/218,646, dated Mar. 27, 2017, 24 pages.
Non-Final Office Action from U.S. Appl. No. 14/218,677, dated Feb. 10, 2017, 18 pages.
Non-final Office Action from U.S. Appl. No. 14/268,563, dated Apr. 21, 2017, 83 pages.
Non-Final Office Action from U.S. Appl. No. 14/448,814, dated Apr. 5, 2017, 57 pages.
Notice of Allowance from U.S. Appl. No. 14/218,551, dated Feb. 8, 2017, 56 pages.
Notice of Allowance from U.S. Appl. No. 14/218,551, dated Mar. 1, 2017, 7 pages.
Notice of Allowance from U.S. Appl. No. 14/268,733, dated Jan. 20, 2017, 62 pages.
Notice of Allowance from U.S. Appl. No. 14/448,747, dated Jun. 20, 2017, 14 pages.
Notice of Allowance from U.S. Appl. No. 14/448,868, dated Apr. 27, 2017, 52 pages.
Notice of Allowance from U.S. Appl. No. 14/448,868, dated Mar. 23, 2017, 57 pages.
Notice of Allowance from U.S. Appl. No. 14/487,992, dated Apr. 12, 2017, 14 pages.
Notice of Allowance from U.S. Appl. No. 14/487,992, dated Dec. 27, 2016, 28 pages.
Notice of Allowance from U.S. Appl. No. 14/487,992, dated Jun. 14, 2017, 14 pages.
Office Action from foreign counterpart Taiwan Patent Application No. 102148853, dated Feb. 17, 2017, 9 pages.
Partial Supplementary European Search Report from European Patent Application No. 14770682.4, dated Oct. 14, 2016, 8 pages.
TechTarget, What is network perimeter? Definition from WhatIs.com downloaded from http://searchnetworking.techtarget.com/definition/network-perimeter on Apr. 14, 2017, 5 pages.
Final Office Action from U.S. Appl. No. 14/066,273, dated Sep. 8, 2017, 30 pages.
Final Office Action from U.S. Appl. No. 14/218,504, dated Sep. 12, 2017, 83 pages.
Final Office Action from U.S. Appl. No. 14/218,575, dated Jul. 31, 2017, 42 pages.
Final Office Action from U.S. Appl. No. 14/218,646, dated Sep. 27, 2017, 81 pages.
Final Office Action from U.S. Appl. No. 14/218,677, dated Sep. 28, 2017, 16 pages.
Final Office Action from U.S. Appl. No. 14/448,814 dated Oct. 6, 2017, 24 pages.
First Office Action and Search Report from foreign counterpart China Patent Application No. 201380068869.3, dated Sep. 19, 2017, 15 pages. (translation available only for office action).

(56) References Cited

OTHER PUBLICATIONS

First Office Action and Search Report from foreign counterpart China Patent Application No. 201480025959.9, dated Jul. 7, 2017, 10 pages.
International Preliminary Report on Patentability for Application No. PCT/US2015/042786, dated Feb. 9, 2017, 7 pages.
International Preliminary Report on Patentability for Application No. PCT/US2015/042799, dated Feb. 9, 2017, 7 pages.
International Preliminary Report on Patentability for Application No. PCT/US2015/042870, dated Feb. 9, 2017, 8 pages.
International Preliminary Report on Patentability for Application No. PCT/US2015/050348, dated Mar. 30, 2017, 7 pages.
International Preliminary Report on Patentability for Application No. PCT/US2015/42783, dated Feb. 9, 2017, 12 pages.
International Preliminary Report on Patentability for Application No. PCT/US2015/42827, dated Feb. 9, 2017, 6 pages.
Non-Final Office Action from U.S. Appl. No. 14/218,611, dated Sep. 2017, 76 pages.
Non-Final Office Action from U.S. Appl. No. 14/218,692, dated Sep. 2017, 37 pages.
Non-Final Office Action from U.S. Appl. No. 14/218,743, dated Aug. 2, 2017, 24 pages.
Non-Final Office Action from U.S. Appl. No. 14/859,328, dated Jul. 14, 2017, 29 pages.
Non-Final Office Action from U.S. Appl. No. 15/396,452 dated Oct. 13, 2017, 76 pages.
Non-Final Office action from U.S. Appl. No. 15/595,460, dated Jul. 27, 2017, 9 pages.
Notice of Allowance from U.S. Appl. No. 14/218,551, dated Aug. 16, 2017, 24 pages.
Notice of Allowance from U.S. Appl. No. 14/448,868, dated Jun. 26, 2017, 14 pages.
Notice of Allowance from U.S. Appl. No. 14/487,992, dated Jul. 17, 2017, 8 pages.
Extended European Search Report for Application No. 15786487.7, dated Oct. 23, 2017, 8 pages.
Extended European Search Report for Application No. 15786796.1, dated Nov. 33, 2017, 9 pages.
Extended European Search Report for Application No. 15826660.1, dated Nov. 16, 2017, 9 pages.
Extended European Search Report for Application No. 15827334.2, dated Nov. 17, 2017, 8 pages.
International Search Report and Written Opinion for Application No. PCT/US2017/045534, dated Nov. 27, 2017, 14 pages.
Kim H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Starnberger G., et al., "QR-TAN: Secure Mobile Transaction Authentication," Availability, Reliability and Security, 2009, ARES'09, International Conference on IEEE, Mar. 16, 2009, pp. 578-585.
LIYMATIA0 M.L.T., et al., "Time-based OTP authentication via secure tunnel (TOAST); A mobile TOTP scheme using TLS seed exchage and encrypted offline keystore," 2014 4th IEEE International Conference on Information Science and Technology, IEEE, Apr. 26, 2014, pp. 225-229.
Final Office Action from U.S. Appl. No. 14/268,563, dated Nov. 3, 2017, 46 pages.
Notice of Allowance from U.S. Appl. No. 14/448,868, dated Nov. 17, 2017, 15 pages.

\* cited by examiner

US 9,887,983 B2

APPARATUS AND METHOD FOR IMPLEMENTING COMPOSITE AUTHENTICATORS

BACKGROUND

Field of the Invention

This invention relates generally to the field of data processing systems. More particularly, the invention relates to a system and method for implementing composite authenticators.

Description of Related Art

Existing systems have been designed for providing secure user authentication over a network using biometric sensors. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1:
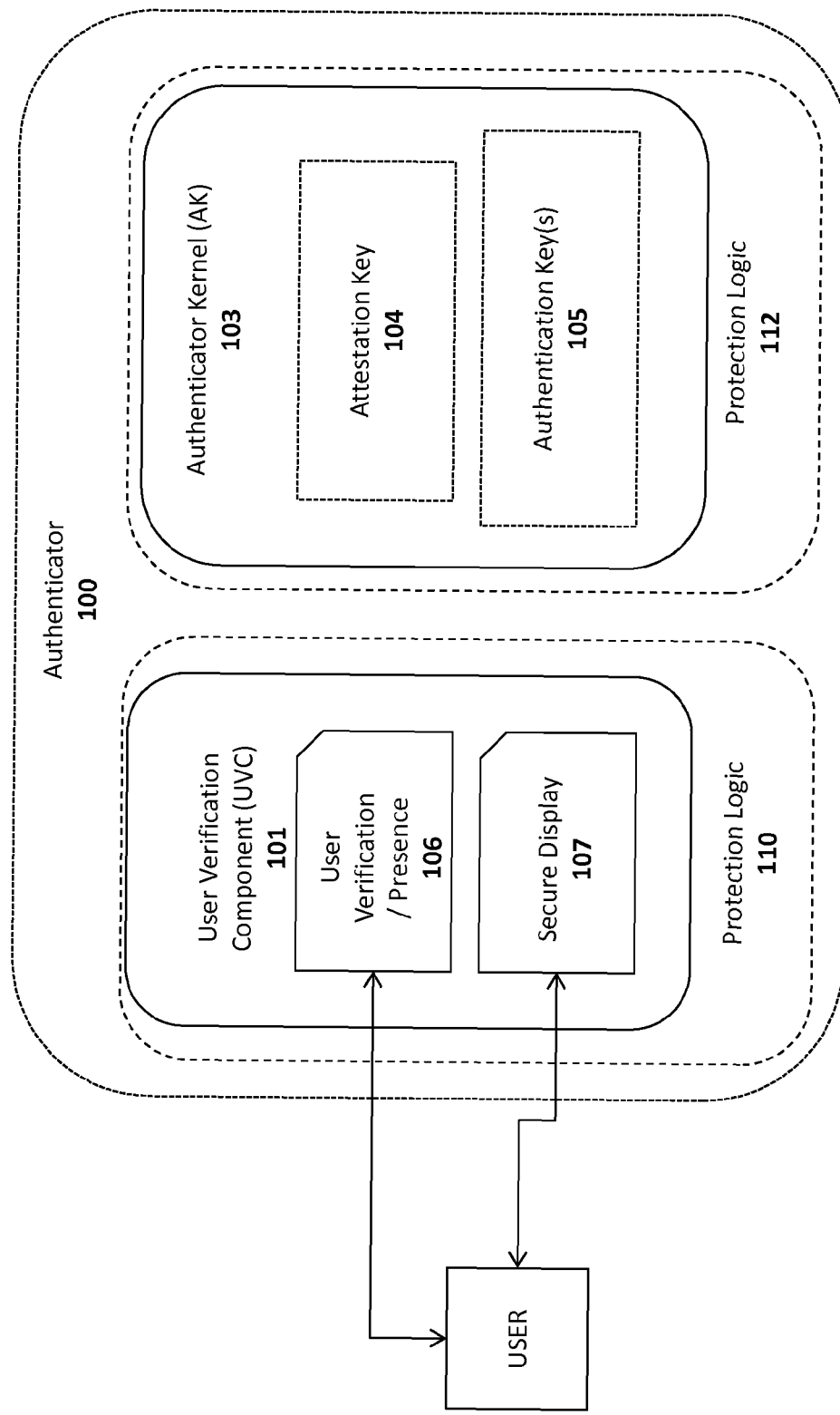
FIG. 1 illustrates one embodiment of a composite authenticator with a plurality of components.

Described below are embodiments of an apparatus, method, and machine-readable medium for implementing composite authenticators. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices. These devices are sometimes referred to herein as "authenticators", "tokens" or "authentication devices." Various different biometric devices may be used including, but not limited to, fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user). The authentication capabilities may also include non-biometric devices such as trusted platform modules (TPMs) and smartcards.

The assignee of the present application has developed extensions to the OSTP framework which are described in the following co-pending applications, all of which are incorporated herein by reference (hereinafter referred to as the "co-pending applications"):

QUERY SYSTEM AND METHOD TO DETERMINE AUTHENTICATION CAPABILITIES, Ser. No. 13/730,761, filed Dec. 28, 2012;

SYSTEM AND METHOD FOR EFFICIENTLY ENROLLING, REGISTERING, AND AUTHENTICATING WITH MULTIPLE AUTHENTICATION DEVICES, Ser. No. 13/730,776, Filed Dec. 28, 2012;

SYSTEM AND METHOD FOR PROCESSING RANDOM CHALLENGES WITHIN AN AUTHENTICATION FRAMEWORK, Ser. No. 13/730,780, filed Dec. 28, 2012;

SYSTEM AND METHOD FOR IMPLEMENTING PRIVACY CLASSES WITHIN AN AUTHENTICATION FRAMEWORK, Ser. No. 13/730,791, filed Dec. 28, 2012; and SYSTEM AND METHOD FOR IMPLEMENTING TRANSACTION SIGNING WITHIN AN AUTHENTICATION FRAMEWORK, Ser. No. 13/730,795, filed Dec. 28, 2012.

Some of the embodiments of the invention described herein employ client-side "Authenticators" which encapsulate the following security-relevant functions:

1. Storing and using a cryptographic attestation key
2. Generating, storing and using cryptographic authentication keys
3. Local user verification or verification of user presence
4. Secure Display of information for the end user In one embodiment, some of the above functions (e.g., 3 and 4) are optional. In addition, one embodiment of the invention includes authenticators which implement the following security objectives:

1. Ensure that the Attestation Key: (a) is only used to attest Authentication Keys generated and protected by the FIDO Authenticator; and (b) never leaves the FIDO Authenticator boundary.

2. If local user verification (sometimes also referred to as "user authentication") is claimed to be supported, ensure that: (a) the Authentication cannot be bypassed/forged by a software application (e.g. malware "entering" a PIN into the authenticator); (b) the confidentiality of the Authentication data is protected (e.g. malware cannot access a PIN entered by the user nor the reference data); and (c) User Authentication is required before generating a new authentication key and reach time before using such authentication key.

One way to implement an authenticator is to implement all of the components responsible for the above functions in a single module which is protected by a single protective shell. For example the entire authenticator may be implemented in a Trusted Application (TA) running in a Trusted Execution Environment (TEE) (e.g., on a client platform which supports trusted execution). In this implementation, the TA is signed ensuring that the Authenticator cannot be modified and the TEE protects the TA when executed.

In one embodiment of the invention, each authenticator is logically subdivided into a plurality of independent components each of which include independent security and authentication capabilities. For example, in FIG. 1, rather than implementing all of the components responsible for the above functions in a single module which is protected by a single shell, the authenticator 100 is implemented with two separate, independent authenticator components: a user verification component (UVC) 101 and an authenticator kernel (AK) 103, each with its own protection logic 110 and 112, respectively. In this example, the AK 103 securely manages attestation key(s) 104 and authentication keys 105 for the authenticator 100 and the UVC 101 manages user verification/presence functions 106 and secure display functions 107 (specific examples of which are described below and in the co-pending applications).

Figure 3:
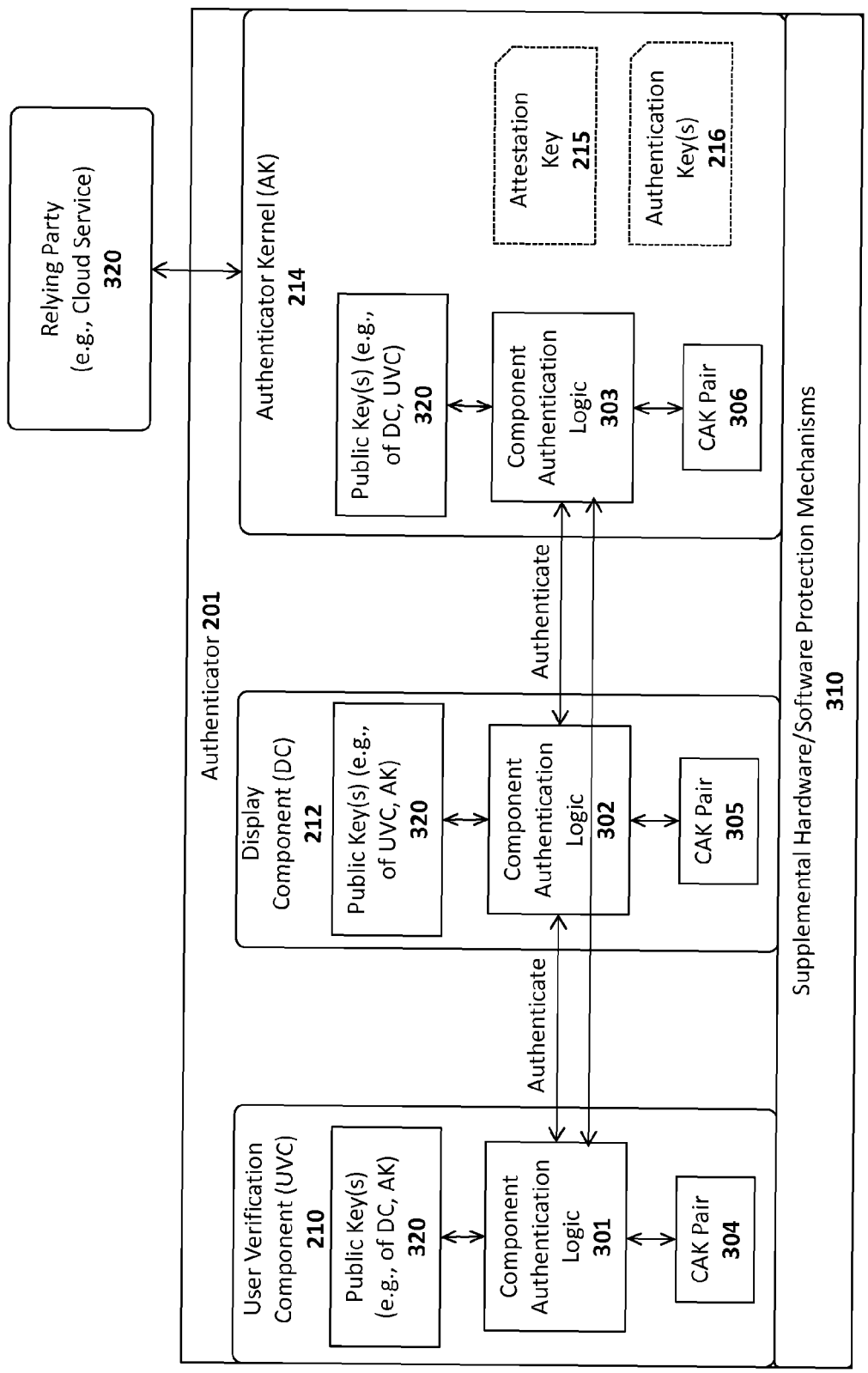
FIG. 3 illustrates one embodiment of an authenticator which includes component authentication logic for managing a component authentication key (CAK) pair for authenticating components.

As discussed in detail below, the protection logic 110, 112 of each component may include a component authentication engine for authenticating every component with one or more other components executed on the client device (see, e.g., FIG. 3 and associated text). In addition, the protection logic may leverage additional hardware/software protection mechanisms built in to the client platform (e.g., such as secure elements (SEs), chain of trust technology, trusted user interface technology, OS based protection mechanisms, etc.). Details associated with each of these embodiments are set forth below.

Figure 2:
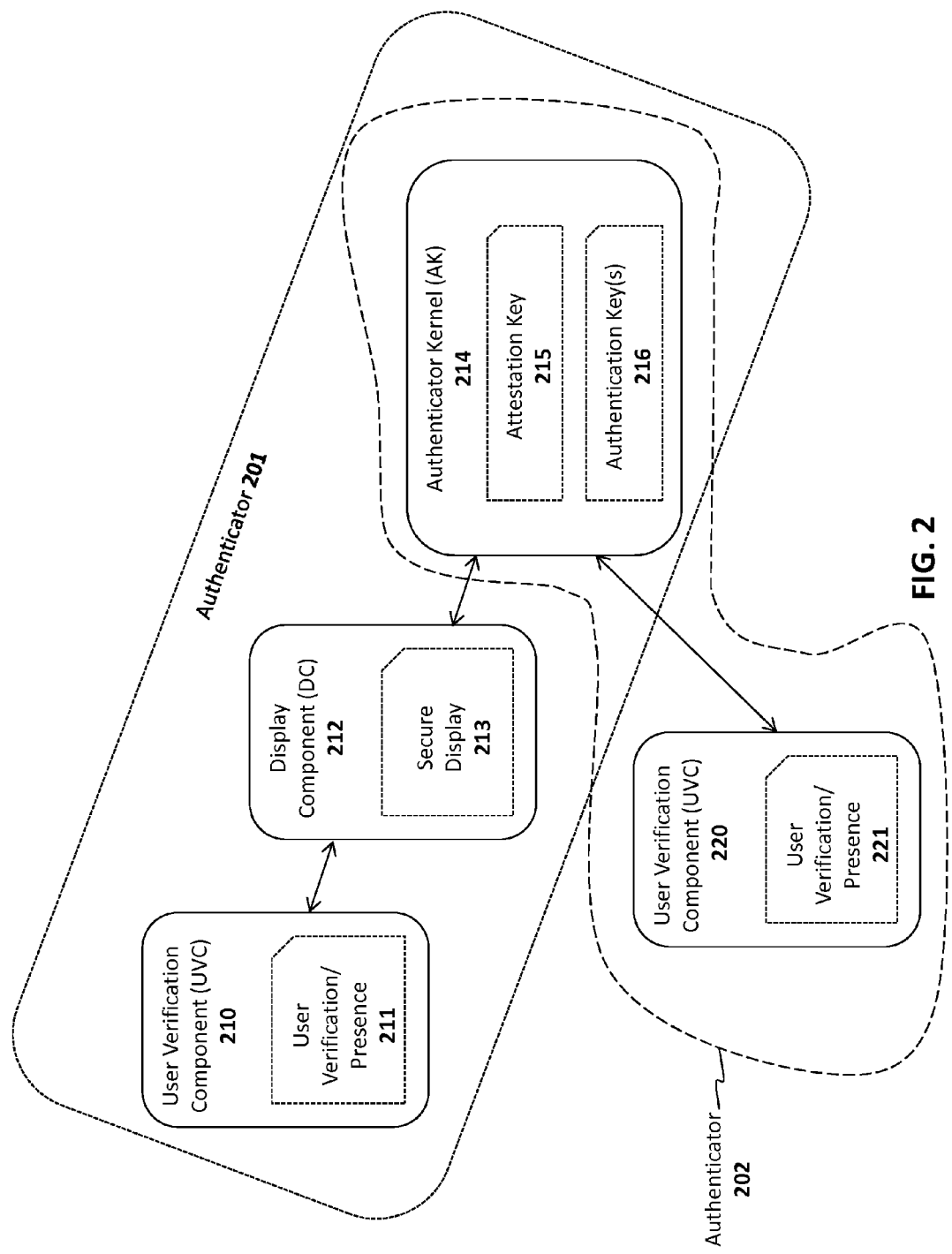
FIG. 2 illustrates one embodiment in which two authenticators share components.

FIG. 2 illustrates an embodiment of the invention in which multiple logical authenticators 201-202 are built from a set of protected authenticator components. In particular, the component building blocks for logical authenticator 201 include a user verification component (UVC) 210 for managing user verification and presence; a display component (DC) 212 for ensuring that information displayed to the end user is exactly the information being confirmed by a transaction (i.e., "What you See is what you Sign" or WYSI-WYS); and an authenticator kernel (AK) component 214 for securely managing attestation keys 215 (for attesting the model and/or integrity of the authenticators to a relying party as part of a registration process) and authentication keys 216 (for establishing secure communications with relying parties using a unique authentication key for each relying party). The component building blocks for logical authenticator 202 includes UVC 220 for managing user verification and presence, and an authenticator kernel (AK) component 214 for securely managing attestation keys 215 and authentication keys 216. Thus, in this example, multiple logical authenticators share the same underlying AK component 214 for managing and protecting keys. In other embodiments of the invention, other types of components may be shared between multiple authenticators. As discussed above, each of the components is provided with its own, independent protection logic for ensuring that the security objectives set forth above are met.

An authenticator built from components in this manner is referred to as a "Composite Authenticator" because it is composed of separate individual components each having their own protective shell. One benefit to the composite authenticator approach is that once a component has been built for one authenticator, it may be used across multiple authenticators, thereby allowing new secure authenticators to be built more efficiently. For example, as shown in FIG. 2, the same authenticator kernel component 214 is shared between two logical authenticators 201-202. In addition, each authenticator component may be implemented in a manner which is optimized for its specific needs. By way of example, and not limitation, a face recognition based authenticator, whose biometric segmentation and matching algorithm may be too big to implement within a Secure Elements (SEs) or Trusted Execution Environments (TEEs), can still leverage a SE/TEE for protecting its attestation and user authentication keys. In this example, a user verification component (e.g., including segmentation and matching algorithm) may be run outside of the SE/TEE while the authentication kernel component may be implemented within the SE/TEE. Similarly, a fingerprint based Authenticator implemented in a TEE could still leverage a SE authentication kernel for protecting its attestation and user authentication keys and hence protecting against hardware based attacks like differential power analysis (DPA), for example.

In one embodiment, the following security measures are implemented to provide an acceptable level of security for the component authenticators described herein (e.g., "acceptable" for meeting the security objectives specified above). These security measures will be described with reference to FIG. 3 which shows additional details associated with each of the components 210, 212, 214 used to implement the authenticator 201 in FIG. 2.

1. Security Measure (SM) 1: In one embodiment, each component (e.g., the user verification component 210, display component 212, or authentication kernel 214 shown in FIGS. 2-3) has its own "component authentication key" pair (CAK) (e.g., CAK pairs 304, 305, and 306, respectively), which is used to (potentially mutually) register with other components and authenticate messages sent to other components. As indicated in FIG. 3, each component 210, 212, 214 includes component authentication logic 301, 302, 303, respectively, for entering into inter-component authentication transactions using the CAK pairs 304, 305, 306, respectively. In one embodiment, the CAK pairs 304, 305, 306 are public/private key pairs, although the underlying principles of the invention are not limited to such an implementation. In this implementation, each of the components is provided with the public keys of those components with which it needs to authenticate. For example, the UVC 210 knows the public keys (or at least can verify the public keys) 320 of the DC and AK; the DC 212 knows the public keys 321 of the UVC and AK; and the AK 214 knows the public keys of the DC and UVC. In one embodiment, on startup, a component initially enters into a registration transaction with the other components with which it must communicate by sharing its public keys with those components. It may then authenticate with those components using the techniques described below.

2. Security Measure (SM) 2: Each component is capable of authenticating other components it receives messages from by verifying the public CAK of these components. For example, in FIG. 3, the AK 214 can verify the public CAKs of all UVCs 210 and DCs 212 it supports (i.e., the public key in CAK pairs 304 and 305). The UVC and DC may also verify the AK 214's public CAK (i.e., in CAK pair 306) if mutual authentication is implemented.

Figure 4:
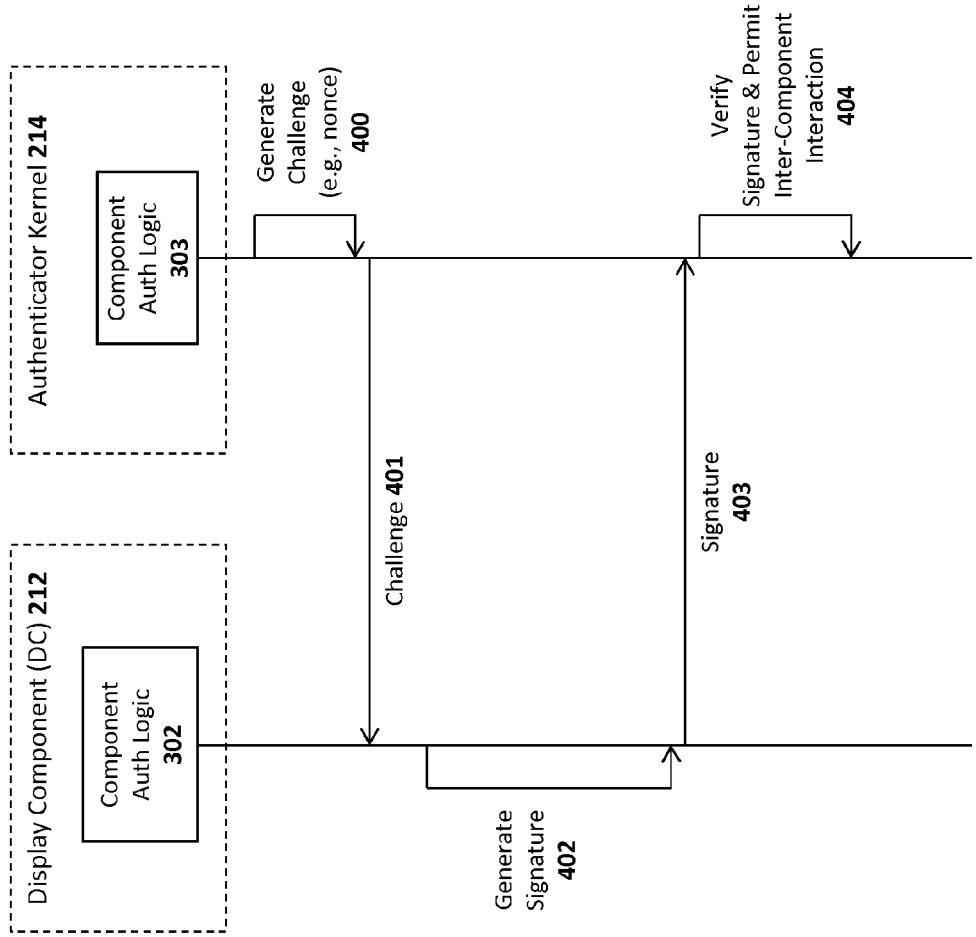
FIG. 4 illustrates a transaction diagram showing one embodiment of authentication between two components.

FIG. 4 is a transaction diagram illustrating how authentication between two components (the AK 214 and DC 212) may be implemented. At transaction 400, the component authentication logic 303 of the AK generates a challenge and sends it to the component authentication logic 302 of the DC in transaction 401. In one embodiment, the challenge is a random number or nonce selected by the component authentication logic 303. In operation 402, the component authentication logic 302 of the DC generates a signature over the challenge and potentially additional data (e.g. whether user has approved the contents of the transaction) using the private key from its CAK pair 305. As is understood by those of skill in the art, generating a signature may involve implementing a hash function over the challenge using the private key. At transaction 403, the component authentication logic 302 of the DC sends the signature back to the component authentication logic 303 of the AK for verification. The component authentication logic 303 of the AK now knows the challenge (e.g., the nonce which it previously generated), the signature generated using the private key of the DC's CAK pair, and the public key of the DC's CAK pair. In transaction 404, it uses the public key of the DC's CAK pair to verify the signature using the random number, thereby authenticating the DC. The DC may also verify the AK 214's public key using a similar set of transactions if mutual authentication is implemented.

3. Security Measure (SM) 3: Depending on the specific implementation, additional security mechanisms may be leveraged to protect the communication between the components. These additional security mechanisms are illustrated in FIG. 3 as supplemental hardware/software protection mechanisms 310. By way of example, and not limitation, these hardware/software protection mechanisms 310 may include those mechanisms built in to the client platform such as secure elements (SEs), Chain of Trust technology, Trusted User Interface technology, OS level access control mechanisms, white box encryption, code obfuscation and runtime integrity protection, to name a few. Using ARM® TrustZone™ or similar technology, for example, the operating system may restrict access to the AK's application programming interface (API) to only trusted programs (e.g., such as legitimate UVCs and DCs). As another example, the operating system may also add the UVC's or DC's package identifier to any API call to the AK. It should be noted, however, that the underlying principles of the invention are not limited to the specific hardware/software protection mechanisms discussed above.

By way of example, in one embodiment, the AK 214 is implemented as an applet in a Secure Element which provides good protection mechanisms for cryptographic keys but has no user interface. A UVC 210 may be implemented as a combination of hardware (e.g., a Fingerprint Sensor) and Trusted Application within a Trusted Execution Environment, both leveraging the ARM TrustZone or similar technology. A DC 212 may be implemented as a Trusted Application using the "Trusted User Interface" capability as defined by the Global Platform. Thus, in this embodiment, when a user swipes a finger on the fingerprint sensor, the trusted application is started and verifies the fingerprint data against stored reference data. A score is then sent to the AK 214, implemented as a Secure Element, which then enters into a series of authentication transactions with the relying party 320 to authenticate the user (e.g., as described in the co-pending applications).

In addition, a different UVC may be implemented as software component running in a Rich-OS (e.g., Android) using a combination of white box encryption, code obfuscation and runtime integrity protection. It could for example use the integrated video camera in combination with face recognition software. Another UVC may be implemented either as a Trusted Application or software running on a Rich-OS using a combination of white box encryption, code obfuscation and runtime integrity protection and providing a PIN based user verification method.

Thus, the component-based approach described herein is easily adaptable to the requirements of different authentication techniques. For example, some types of authentication such as voice recognition and facial recognition need to be implemented as a software component using a normal, rich operating system, because of the significant storage requirements and hardware interface requirements of these authentication types. All of these different types of authentication may be implemented in a secure trusted manner using different UVC components which utilize the same AK component (which, as discussed, may be implemented as a Secure Element.

Note that with the above approach, the various components logically communicate using cryptographically protected (e.g. signed) messages. This logical communication may still be "facilitated" by some other entity (e.g., such as the secure transaction logic discussed below). Moreover, in one embodiment, the logical inter-component messaging described herein is transparent to the relying party 320 which enters into attestation and authentication transactions directly with the authenticator kernel 214 (e.g., using the attestation key 215 and authentication keys 216, respectively). In one embodiment, the AK uses the attestation key 215 to validate the model and/or integrity of the authenticator during registration. For example, the relying party may send a challenge which the AK signs using the attestation key 215. The relying party then uses a corresponding key to validate the signature (e.g., a public key if the attestation key is a private key). Once an authenticator has registered with a relying party, an authentication key 216 is assigned to that relying party. The AK then uses the authentication key 216 associated with a relying party to ensure secure communications with that relying party following registration.

As an additional security measure, in one embodiment, the component authentication logic 301-303 of each component may delete its CAK pair if a component compromise is detected.

Two different types of composite authenticators may be implemented utilizing the underlying principles of the invention: "static" composite authenticators and "dynamic" composite authenticators.

Static Composite Authenticators

Figure 5:
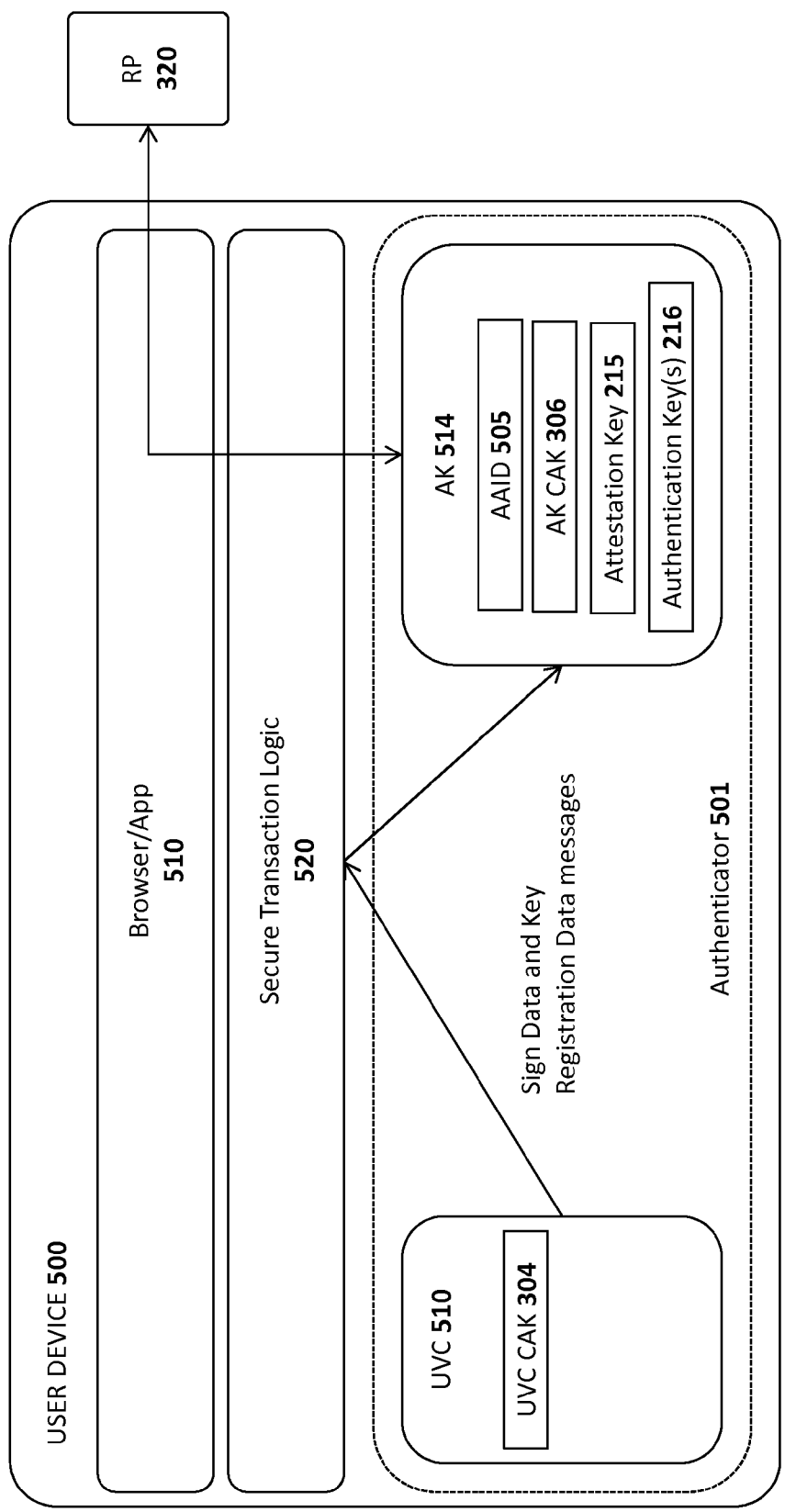
FIG. 5 illustrates static authenticator in accordance with one embodiment of the invention.

Referring to FIG. 5, in one embodiment, a composite authenticator 501 with the following properties is referred to herein as a "static" composite authenticator:

1. for each authenticator 501, the Relying Party 320 has/needs access to a public attestation key (corresponding to attestation key pair 215, but not the public "Component Authentication Keys" (CAKs) 304, 306; and 2. for each supported combination of components (e.g., UVC, DC and AK) a specific Authenticator Attestation ID (AAID) 505 has been specified in advance.

Thus, as illustrated in FIG. 5, for a static composite authenticator, each distinct authenticator 501 is identified by its specific AAID 505. The AK owns one or more attestation key(s) 215 and also selects one of the predefined AAIDs (and the related attestation key) to be used when performing transactions with the relying party 320.

Because the CAK pair is never shared with the relying party 320, it can be authenticator-specific without impacting the user's privacy. This also means that such keys could be revoked individually if successful hacks to individual components are detected. Because CAKs are not used as (publicly visible) "attestation keys," hacks of components are not considered equivalent to hacks of authenticators. In addition, as the communication and security mechanisms of the composite authenticator 501 are not visible outside of the authenticator, the implementation of static composite authenticators doesn't affect the specifications defining the interactions between the authenticator 501 and the relying party 320. In one embodiment, each component 510, 514 is assigned a unique Component-ID which may be similar to an AAID, but it is only relevant to the AK 514 (and not to the RP or any other external entity).

As an additional optimization, in one embodiment, the Online Certificate Status Protocol (OCSP, RFC2560) may be used as a revocation checking method (e.g., "validation") for each CAK certificate. More specifically, the AK 514 may require a sufficiently recent OCSP response for the certificates of the UVCs or DCs related to the public CAK in order to accept the incoming message. The AK 514 may also have one single Attestation Key used for all AAIDs, or it could optionally have one attestation key per AAID, or a combination thereof.

In one embodiment, the AK may maintain a static list of AAIDs. Alternatively, it may accept AAIDs received from an external entity (e.g. UVC/DC) if it is part of a signed "AAID-Update" message used to update the list. In one embodiment, the AAID-Update message has the following structure: Signature (signing_key, AAID|AK-Component-ID|UVC's/DC's public CAK). The private signing_key may be owned by the AK vendor. The public signing_key is either directly part of AK's TrustStore (in a TrustStore implementation) or it can be verified using some certificate stored in the TrustStore (i.e. is chained to such a certificate).

The architecture of the user device 500 illustrated in FIG. 5 also includes a browser/application 510 for establishing communication with the relying party 320 and secure transaction logic 520 for enabling communication with the authenticator. For example, as illustrated, in one embodiment the secure transaction logic 520 enables message passing between the components 510, 514 of each authenticator 501 by exposing an application programming interface (API) for the various components. Thus, in this embodiment, all communication among components such as the exchange of registration data and messages, occurs via the secure transaction logic 520. By way of example, the secure transaction logic 520 may be implemented as the "secure transaction service" described in the co-pending applications (portions of which are set forth below). The browser/application 510 may be used to establish communication with the relying party 320 over a network such as the Internet.

Dynamic Composite Authenticators

Figure 6:
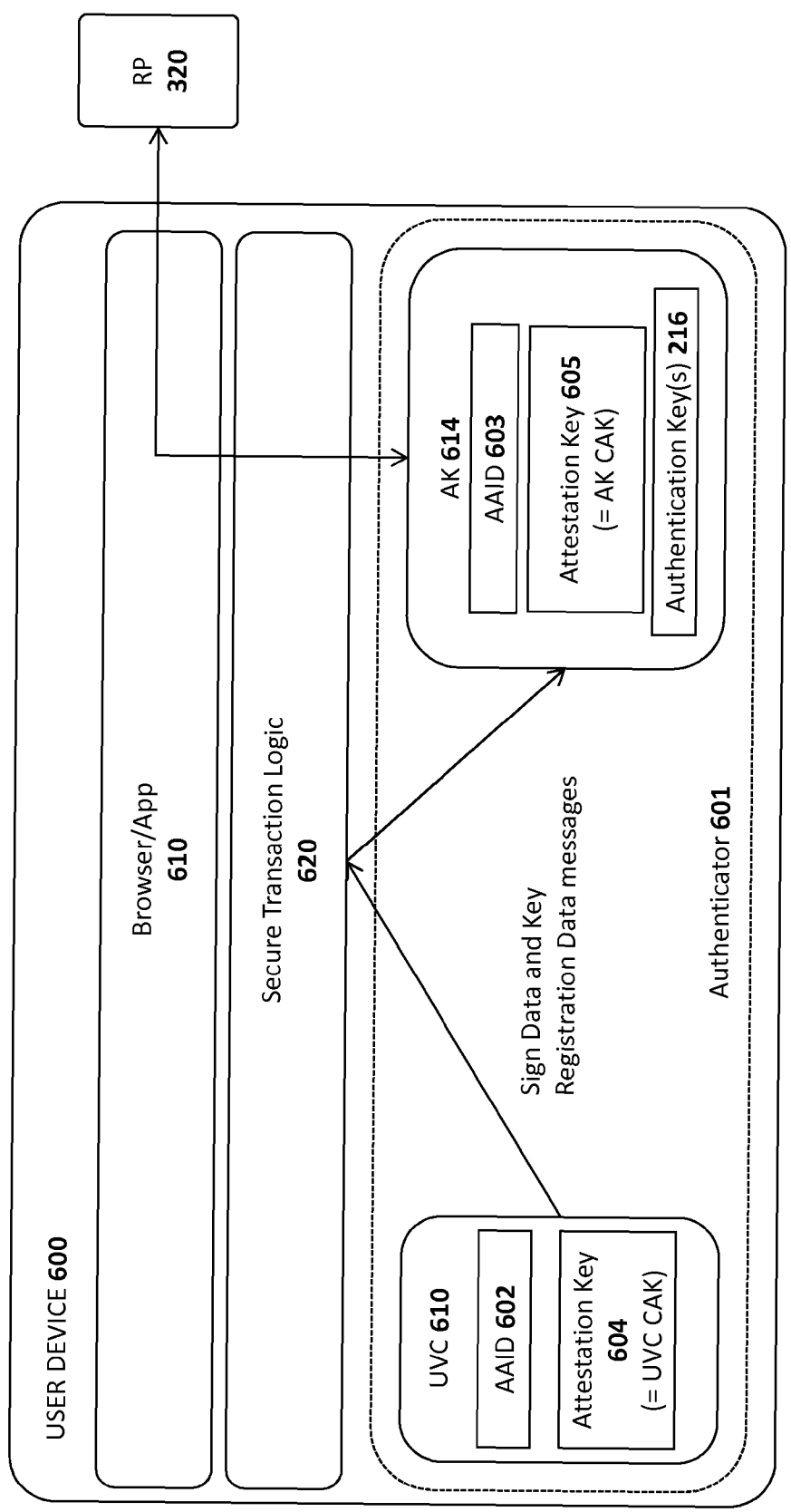
FIG. 6 illustrates a dynamic authenticator in accordance with one embodiment of the invention.

Referring to FIG. 6, a composite authenticator 601 with the following properties is a "dynamic composite authenticator" if:

1. the "Component Authentication Keys" (CAKs) 604, 604 are treated as attestation keys such that the relying party 320 has and needs the related public key to verify the attestation messages (e.g., referred to as "Key Registration Data" in the OSTP specification); and 2. the relying party 320 receives multiple AAIDs 602, 603 (depending on the number of components in the authenticator 601). In one embodiment, it receives the AAIDs 602, 306 of all components 610, 614 of the authenticator 601 as part of a registration message sent from the AK 614 via the secure transaction logic 620 and browser/application 610. While FIG. 6 illustrates only a UVC 610 and AK 614, an alternate embodiment (such as shown in FIG. 3) sends the RP 320 an AAID for the AK, DC, and UVC. As mentioned, however, the underlying principles of the invention are not limited to any particular set of components for implementing an authenticator. In one embodiment, the registration message sent to the RP 320 also has multiple (chained) signatures, one with the AK's attestation key 605 and one for each of the other components (e.g., the UVC's attestation key 604 and the DC's attestation key (not shown)). As mentioned, in one embodiment, the AK 614 includes the other components attestation message(s) in its own attestation message to the RP 320 if and only if it trusts the communication with the other components.

Thus, a dynamically composed authenticator 601 is implemented by dynamically combining multiple components (or, said another way, composing two authenticators to get a new authenticator). Because CAKs are relevant to RPs in this implementation, they should not be authenticator specific in one embodiment to protect the user's privacy. Instead they are either pre-generated/injected as shared keys or they are authenticated using a direct anonymous attestation (DAA) scheme, a cryptographic protocol which enables authentication of a trusted platform while preserving the user's privacy. As the multiple AAIDs and the chained attestation messages are visible to the RP, the implementation of dynamic composite authenticators affects the authentication specification used between the authenticator 601 and relying party 320.

UVC/DC Assertion Verification

Regardless of whether dynamic or static authenticators are used, in one embodiment, the UVC 210 and DC 212 send their output data such as user verification result (UVC) and the user's acceptance of the displayed transaction text (DC) to the AK 214 so that it may be processed according to the authentication specification employed between the AK 214 and the relying party 320.

For registration, in an embodiment with static authenticators, the UVC 210 and DC 212 may send a key registration message to the AK 214 which contains the Component-ID (not the AAID), where the Component-ID is an identifier similar to the AAID, but only relevant to the AK. In one embodiment, the user authentication key of the key registration message is empty and the key registration message is signed by the CAK instead of the attestation key.

For authentication, in one embodiment, the UVC 210 and DC 212 create a message signed by the CAK (not the user authentication key).

The following verification steps are implemented by the AK in one embodiment of the invention:

1. Lookup the internal trust store containing a list of acceptable public CAKs. The public CAKs may either be directly stored in the TrustStore, or there may be a public key certificate for each of the CAKs chaining to a Root Certificate in the TrustStore.

2. The AK verifies the signature of the incoming data from UVC and/or DC using the public CAK (e.g., as discussed above with respect to SM1 and SM2).

3. Check additional platform-specific protection mechanisms such as the package ID of the incoming data or using similar platform-provided protection mechanisms.

4. Check the revocation status of the certificate containing the UVC's or DC's public CAK. As the AK is only interested in the revocation information of a very few number of certificates/keys (i.e. the current UVC's or DC's), Online Certificate Status Protocol (OCSP) (mentioned above) may be employed for revocation checking. The AK is not assumed to have network connection, so the OCSP response is expected as part of the incoming data from the UVC and/or DC.

Optimized Verification Method

A further optimization may be implemented in one embodiment where asymmetric key operations are too expensive compared to symmetric key operations. In such a case, the Key Registration message created by the UVC and/or DC sent to the AK contains a symmetric key SK (e.g. instead of an empty user authentication key field as mentioned above). The modified Key Registration Data message generated by the UVC and sent to the AK may be encrypted using the AK's public CAK (or some other trusted public key belonging to the target component). The modified signature message generated by the UVC and/or DC and sent to the AK is not asymmetrically signed using CAK, but instead it is secured using a hash-based message authentication code (HMAC) computed with the SK. The AK verifies the HMAC using the symmetric key received as part of the Key Registration Data message.

Exemplary System Architectures

Figure 7A:
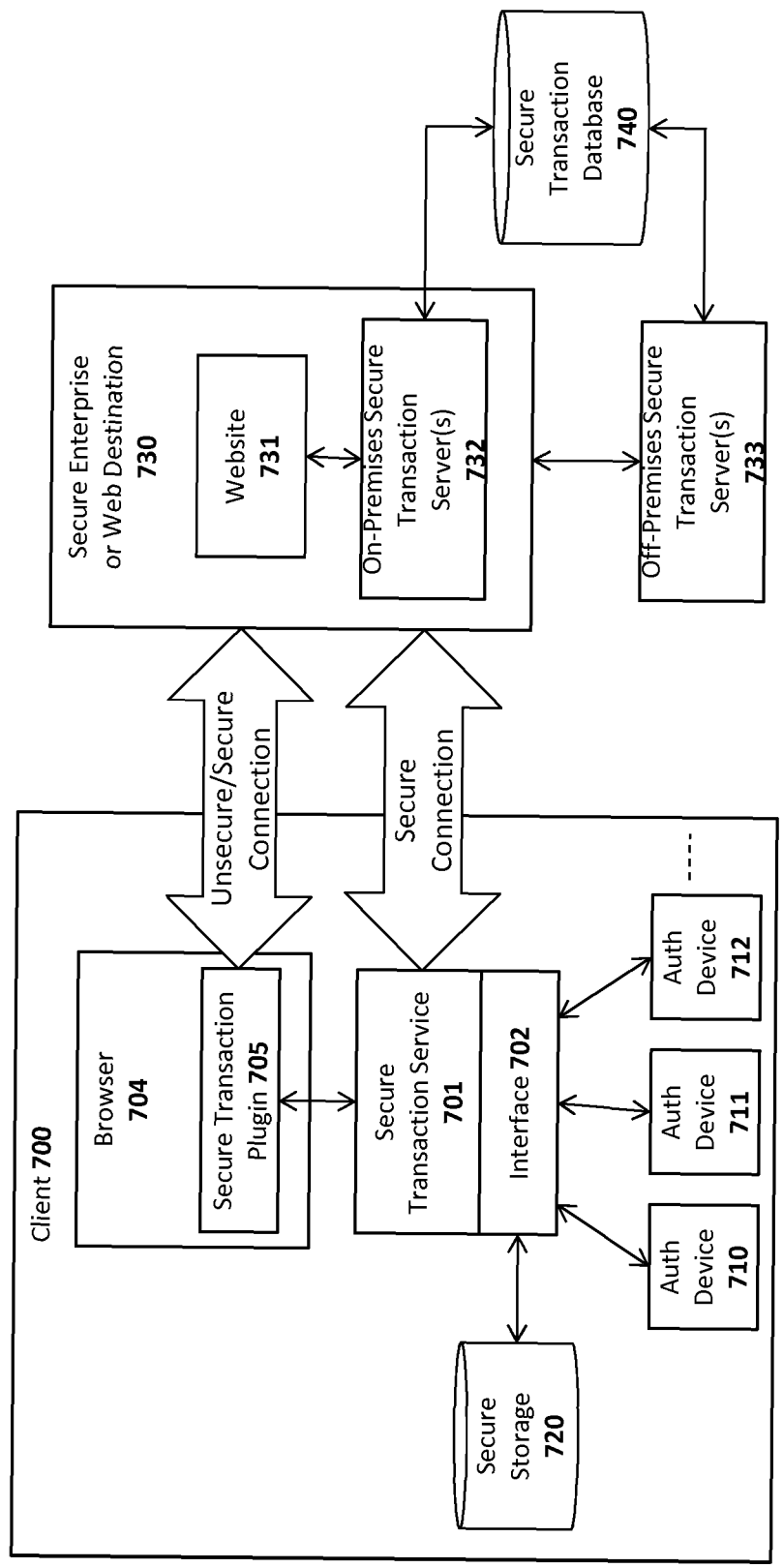
FIGS. 7A-B illustrate an exemplary system architecture on which embodiments of the invention may be implemented.
Figure 7B:
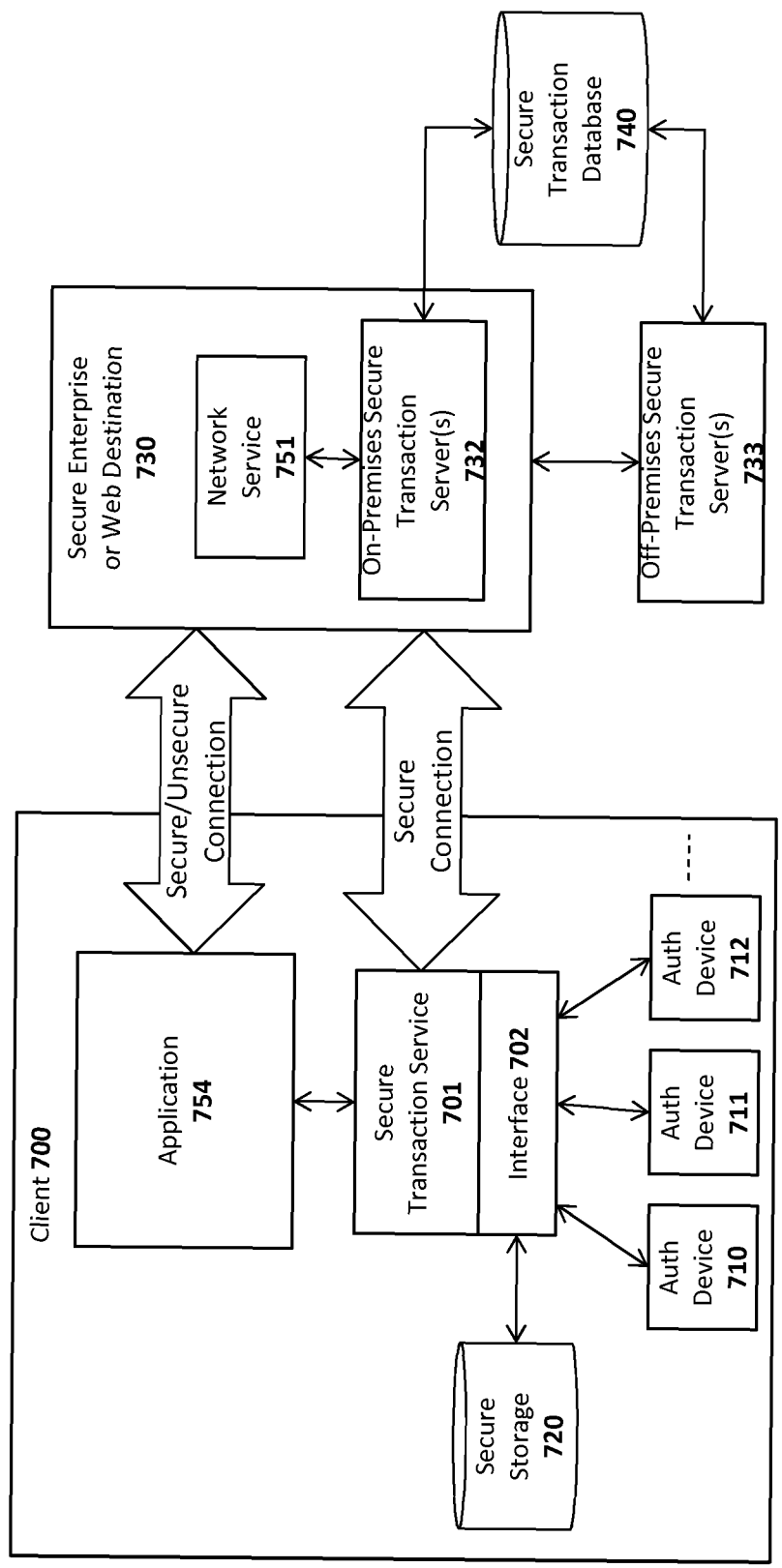

FIGS. 7A-B illustrate two embodiments of a system architecture comprising client-side and server-side components for authenticating a user. The embodiment shown in FIG. 7A uses a browser plugin-based architecture for communicating with a website while the embodiment shown in FIG. 7B does not require a browser. The various techniques described herein for implementing composite authenticators may be implemented on either of these system architectures. For example, an authentication device 710-712 and its associated interface 702 and the secure storage 720 shown in FIGS. 7A-B may include the authenticators and the various authenticator components described above. The browser/application 510, 610 illustrated in FIGS. 5 and 6 may be the application 754 shown in FIG. 7B or the browser 704 shown in FIG. 7A. The secure transaction logic 520, 620 shown in FIGS. 5 and 6 may be implemented as the secure transaction service 701 shown in FIGS. 7A-B. Finally, the relying party 320 may be the secure enterprise or web destination 730 shown in FIGS. 7A-B. It should be noted, however, that the embodiments illustrated in FIGS. 1-6 stand on their own and may be implemented using logical arrangements of hardware and software other than those shown in FIGS. 7A-B.

Turning first to FIG. 7A, the illustrated embodiment includes a client 700 equipped with one or more authentication devices 710-712 for enrolling and authenticating an end user. As mentioned above, the authentication devices 710-712 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards.

The authentication devices 710-712 are communicatively coupled to the client through an interface 702 (e.g., an application programming interface or API) exposed by a secure transaction service 701. The secure transaction service 701 is a secure application for communicating with one or more secure transaction servers 732-733 over a network and for interfacing with a secure transaction plugin 705 executed within the context of a web browser 704. As illustrated, the Interface 702 may also provide secure access to a secure storage device 720 on the client 700 which stores information related to each of the authentication devices 710-712 such as a device identification code, user identification code, user enrollment data (e.g., scanned fingerprint or other biometric data), and keys used to perform the secure authentication techniques described herein. For example, as discussed in detail below, a unique key may be stored into each of the authentication devices and used when communicating to servers 730 over a network such as the Internet.

As discussed below, certain types of network transactions are supported by the secure transaction plugin 705 such as HTTP or HTTPS transactions with websites 731 or other servers. In one embodiment, the secure transaction plugin is initiated in response to specific HTML tags inserted into the HTML code of a web page by the web server 731 within the secure enterprise or Web destination 730 (sometimes simply referred to below as "server 730"). In response to detecting such a tag, the secure transaction plugin 705 may forward transactions to the secure transaction service 701 for processing. In addition, for certain types of transactions (e.g., such as secure key exchange) the secure transaction service 701 may open a direct communication channel with the on-premises transaction server 732 (i.e., co-located with the website) or with an off-premises transaction server 733.

The secure transaction servers 732-733 are coupled to a secure transaction database 740 for storing user data, authentication device data, keys and other secure information needed to support the secure authentication transactions described below. It should be noted, however, that the underlying principles of the invention do not require the separation of logical components within the secure enterprise or web destination 730 shown in FIG. 7A. For example, the website 731 and the secure transaction servers 732-733 may be implemented within a single physical server or separate physical servers. Moreover, the website 731 and transaction servers 732-733 may be implemented within an integrated software module executed on one or more servers for performing the functions described below.

As mentioned above, the underlying principles of the invention are not limited to a browser-based architecture shown in FIG. 7A. FIG. 7B illustrates an alternate implementation in which a stand-alone application 754 utilizes the functionality provided by the secure transaction service 701 to authenticate a user over a network. In one embodiment, the application 754 is designed to establish communication sessions with one or more network services 751 which rely on the secure transaction servers 732-733 for performing the user/client authentication techniques described in detail below.

In either of the embodiments shown in FIGS. 7A-B, the secure transaction servers 732-733 may generate the keys which are then securely transmitted to the secure transaction service 701 and stored into the authentication devices within the secure storage 720. Additionally, the secure transaction servers 732-733 manage the secure transaction database 720 on the server side.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

We claim:

1. A client device comprising:
   one or more authenticators for authenticating a user of the client device with a relying party, each authenticator comprising a plurality of authentication components, each of the authentication components within the client device performing a different function within the context of the authenticator within which it is used; and
   component authentication logic on the client device to attest to a model or integrity of at least one of the plurality of authentication components to one or more of the other authentication components prior to allowing the authentication components to be combined on the client device to form the authenticator,
   wherein authenticating the user with the relying party comprises:
   reading biometric authentication data from a user and determining whether to successfully authenticate the user based on a comparison with biometric reference data;
   establishing communication with a remote relying party;
   performing an attestation transaction with the relying party to attest to the model and/or integrity of a biometric device to the relying party by receiving a challenge from the relying party, signing the challenge using an attestation key to generate a signature, and sending the signature to the relying party, wherein the relying party verifies that the signature is valid using a key of the relying party.

2. The client device as in claim 1 wherein the authentication components include a user verification component to authenticate a user and an authentication kernel component to establish secure communication with the relying party.

3. The client device as in claim 1 wherein the authentication components include a display component to securely display information for the user and an authentication kernel component to establish secure communication with the relying party.

4. The client device as in claim 1 wherein one of the authentication components comprises a first authentication component and a second authentication component and wherein attesting to the model and/or integrity of the first authentication component to the second authentication component comprises the operations of:
   receiving a challenge from the second authentication component;
   generating a signature or message authentication code (MAC) over the challenge using a key of the first authentication component; and
   verifying the signature or MAC by the second authentication component.

5. The client device as in claim 4 wherein the key comprises a private key and wherein the second component uses a corresponding public key and the challenge to verify the signature.

6. The client device as in claim 1 wherein the challenge comprises a randomly generated nonce.

7. The client device as in claim 1 wherein the at least one authentication component includes a component authentication key (CAK) pair managed by the component authentication logic, the CAK pair usable to attest to the model and/or integrity of the at least one authentication component.

8. The client device as in claim 7 wherein each authentication component of the plurality of authentication components includes a CAK pair managed by the component authentication logic, the CAK pair of each authentication component usable to attest to the model and/or integrity of each of the other authentication components.

9. The client device as in claim 1 wherein the authenticator comprises a first authenticator, the client device further comprising a second authenticator sharing at least one of the plurality of authentication components with the first authenticator.

10. The client device as in claim 9 wherein the authentication components include a user verification component to authenticate a user, a display component to securely display information for the user and an authentication kernel component to establish secure communication with the relying party, wherein at least the authentication kernel component is shared between the first and second authenticators.

11. The client device as in claim 1 wherein at least one of the components is implemented as a trusted application executed within a trusted execution environment (TEE) on the client device.

12. The client device as in claim 11 wherein at least one of the components is implemented as a Secure Element (SE) defined within the client device.

13. The client device as in claim 12 wherein at least one of the components is implemented using a Trusted User Interface.

14. The client device as in claim 1 wherein attesting to the model and/or integrity of the at least one authentication component is performed using a direct anonymous attestation (DAA) scheme.

15. The client device as in claim 1 wherein the operation of attesting to the model and/or integrity of the at least one authentication component further comprises: checking a revocation status of a certificate containing at least one component's public keys.

16. The client device as in claim 1 wherein different combinations of components are combined to form different authenticators, wherein at least some of the components are shared between authenticators and wherein each of the different authenticators are identified by the relying party using a unique authenticator attestation ID (AAID) code.

17. The client device as in claim 1 wherein different authentication components are combined to form different authenticators, wherein at least some of the different authentication components are shared between authenticators and wherein each of the different authentication components are uniquely identified by the relying party using a unique component ID code.

18. The client device as in claim 1 wherein the relying party comprises a cloud service.

19. The client device as in claim 1 further comprising:
   a client application and/or browser to establish remote communication with the relying party, wherein the authenticator authenticates the user of the client device with the relying party using the remote communication established via the client application and/or browser.

* * * * *